(12) United States Patent
Lajszczak et al.

(10) Patent No.: US 12,254,864 B1
(45) Date of Patent: Mar. 18, 2025

(54) AUGMENTING DATASETS FOR TRAINING AUDIO GENERATION MODELS

(71) Applicant: Amazon Technologies, Inc., Seattle, WA (US)

(72) Inventors: Mateusz Aleksander Lajszczak, Cambridge (GB); Adam Marek Gabrys, Sopot (PL); Arent van Korlaar, London (GB); Ruizhe Li, London (GB); Elena Sergeevna Sokolova, London (GB); Jaime Lorenzo Trueba, Madrid (ES); Arnaud Vincent Pierre Yves Joly, Cambridge (GB); Marco Nicolis, London (GB); Ekaterina Petrova, Oberhaching (DE)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 17/854,439

(22) Filed: Jun. 30, 2022

(51) Int. Cl.
| | |
|---|---|
| *G10L 13/047* | (2013.01) |
| *G10L 15/02* | (2006.01) |
| *G10L 15/16* | (2006.01) |
| *G10L 15/18* | (2013.01) |
| *G10L 15/22* | (2006.01) |
| *G10L 25/18* | (2013.01) |

(52) U.S. Cl.
CPC ............ *G10L 13/047* (2013.01); *G10L 15/02* (2013.01); *G10L 15/16* (2013.01); *G10L 15/1815* (2013.01); *G10L 15/22* (2013.01); *G10L 25/18* (2013.01); *G10L 2015/025* (2013.01)

(58) Field of Classification Search
USPC ........................................ 704/219, 9, 10, 257
See application file for complete search history.

(56) References Cited

U.S. PATENT DOCUMENTS

| | | | |
|---|---|---|---|
| 2020/0380949 A1* | 12/2020 | Wu ..................... | G06N 3/045 |
| 2021/0217408 A1* | 7/2021 | Hakkani-Tur ........ | G06F 40/284 |
| 2022/0051654 A1* | 2/2022 | Finkelstein ............ | G06N 3/045 |
| 2022/0122590 A1* | 4/2022 | Haidar .................... | G10L 15/16 |
| 2023/0056128 A1* | 2/2023 | Zhang .................... | G10L 13/10 |
| 2023/0059882 A1* | 2/2023 | Zhang .................... | G10L 13/10 |

\* cited by examiner

*Primary Examiner* — Leonard Saint-Cyr
(74) *Attorney, Agent, or Firm* — Pierce Atwood LLP

(57) ABSTRACT

A target voice dataset may be augmented using speech prediction. Encoder and decoder models may be trained to encode audio data into encoded speech data, and convert it back to audio. The encoded units may include semantic information (e.g., phonemes and/or words) as well as feature data indicating prosody, timbre, speaker identity, speech style, emotion, etc. of speech. An acoustic/semantic language model (ASLM) may be configured to predict encoded speech data in a manner analogous to a language model predicting words; for example, based on preceding encoded speech data. The models may be used to generate synthesized speech samples having voice characteristics (e.g., feature data) similar to those of the target voice dataset. The augmented dataset may be used to train a text-to-speech (TTS) model to reproduce the target voice characteristics, and may improve performance of the TTS model over training with only the original target voice dataset.

20 Claims, 15 Drawing Sheets

AUGMENTING DATASETS FOR TRAINING AUDIO GENERATION MODELS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
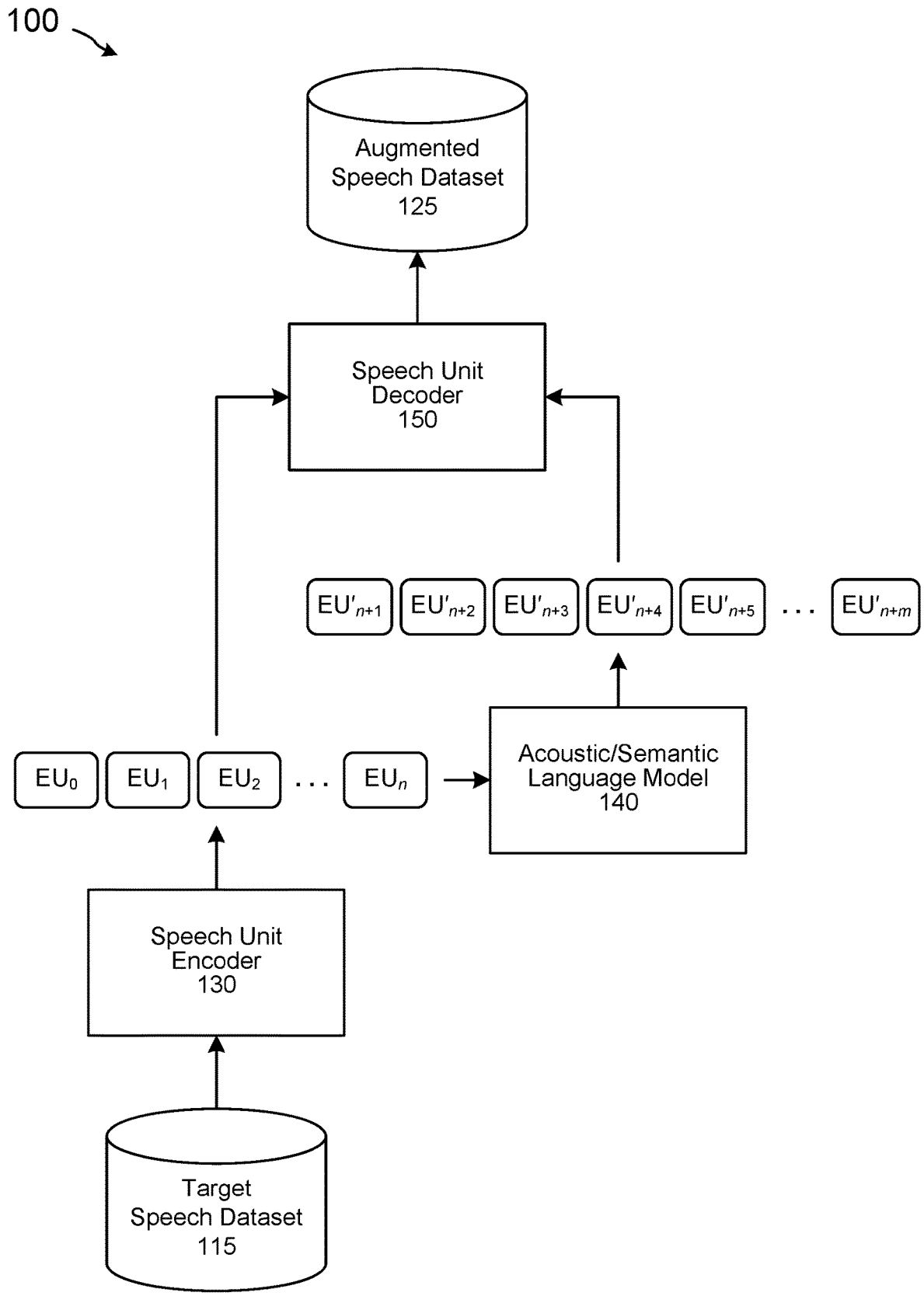
FIG. 1 is a conceptual diagram that illustrates using an acoustic/semantic language model (ASLM) to generate an augmented speech dataset from a target dataset, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A TTS system may be trained using a training dataset including recorded speech and transcripts thereof. Some uses of a TTS system may involve generating synthetic speech having certain voice characteristics; for example, generate synthesized speech that imitates the voice of a particular individual such as a celebrity, specific user, or the like. In some cases, the training dataset may include several hours of recorded speech data. When training data is limited, however, performance of resulting TTS models may suffer from reduced speech quality and intelligibility. Voice conversion is another approach used to generate speech with particular voice characteristics; but instead of generating synthesized speech directly, a voice conversion model may receive audio data representing the speech and modify it to have different voice characteristics. Voice conversions approaches may suffer the same drawbacks as a TTS model (e.g., poor speech quality and/or intelligibility) if not trained with a sufficiently large dataset.

Offered are, among other things, systems and methods for generating audio data based on a target sample. The generated audio data may be used to, for example, augment a dataset for training a TTS model based on a sample of target speech. Techniques described herein may be used to expand a target voice by generating synthesized speech having similar voice characteristics. The system may employ an acoustic/semantic language model (ASLM) to predict a continuation of speech based on a prompt. The ASLM may be a probabilistic statistical model that can predict a continuation of speech based on previous speech and/or a speech prompt (or, in some cases, based on a token indicating that the model should commence outputting predictions). For example, an ASLM may receive and output data in the form of encoded speech units.

An encoded speech unit may represent of various information about speech, including semantic information (e.g., as would be represented by text and/or phonemes), acoustic information (e.g., pitch, timber), emotion (e.g., surprised, amused, etc.), style (e.g., news anchor, sports commentary, storytelling, etc.), and/or identity (e.g., features indicative of a particular speaker such as a particular user or celebrity).

Encoded speech unit data may be generated from audio data; for example, data representing Mel-spectrograms. The audio data may be from human speech received by a voice-controlled device, speech samples in a target voice dataset or other training dataset, or elsewhere. A first computer model (or models) may process the audio data and encode it into encoded speech unit data. In some implementations, a neural network encoder can be trained to receive and process audio data to generate and output encoded speech unit data. A second computer model (or models) may generate audio data from the encoded speech units. In some implementations, a neural network decoder can be trained to receive and process the encoded speech unit data to generate output audio data.

The encoder and/or decoder may be trained to encode the encoded speech unit data with information relevant to generating synthesized speech, and decode the encoded speech unit data back into ineligible speech. For example, rather than training the encoder and/or decoder to accurately reproduce given audio data (e.g., based on a pixel-to-pixel loss between spectrograms), the encoder/decoder may be trained such that the output audio data includes the desired information about prosody, timbre, phonemes, emotion, speaker identity, speaking style, etc., while disregarding features corresponding to noise, room reverberations and/or echo, background media and/or conversations, etc. To that end, the encoder/decoder may be trained based on a combination of factors. For example, the system may employ a measure of perceptual loss to gauge how effectively the encoder/decoder extracts and reproduces semantic information and feature data from the audio data. The system may also employ a measure of adversarial loss based on whether the system can distinguish the generated audio data from natural (e.g., not synthesized) audio data containing human speech—in other words, the system may determine whether the generated audio data "looks like" real audio data.

The trained encoder may be used to generate encoded speech units based on a human speech prompt of a target voice. The ASLM may receive the encoded speech units corresponding to the prompt, and generate encoded speech units corresponding to a predicted continuation of the speech. The trained decoder may process the continuation encoded speech units (and, in some cases, the prompt encoded speech units as well) and generate audio data. The audio data may represent an augmented dataset that can be used to train a TTS model. For example, while the target voice dataset may be insufficient in size/duration for training a TTS model, the technique described herein may expand the dataset by a factor 10, 20, 30, or more. The resulting augmented dataset may allow for training a TTS model to achieve excellent intelligibility and/or speech quality.

The techniques presented herein may have various applications for generating audio data such as synthesized speech for use in different contexts. For example, the system may be used to train a TTS system to generate synthesized speech having voice characteristics of a celebrity, friend, family member, etc., (e.g., the target voice) based on limited voice samples. Each character voice may be a different TTS style for which a TTS model is to be trained; thus, reducing the amount of training data needed can make it possible for content creators to create and/or assign character voices. In some cases, the amount of data needed to train a TTS model to reproduce the character voice may be reduced from 10 hours to five minutes. The TTS system may then be used to, for example, read a book in the author's voice, or provide different voices for different characters; read the news in a particular reporter's voice; provide different character voices for a video game; "dub" a movie or other programming using a synthesized voice having characteristics of the original speaker; deliver a message (such as a text or email) from another user in that user's voice; etc. In other examples, content creators (e.g., authors, advertisers, and/or other users) may provide and/or select particular voice characteristics for their works based on limited samples. Users may select or create different virtual assistant "personalities" having different voices based on voice samples.

The system may be configured to incorporate user permissions and may only perform activities disclosed herein if approved by a user. The system may incorporate safeguards to prevent use of the system to replicate an individual's voice without authorization to, for example, impersonate the individual for purposes of committing fraud and/or theft, generate "deep fakes," play pranks, etc. For example, the system may require real-time verification of the target voice. The system may prompt the speaker of the target voice to speak words of approval, say random words chosen by the system, and/or repeat one or more of the utterances in the target voice dataset, etc. The systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram that illustrates using the ASLM 140 to generate an augmented speech dataset 125 from a target speech dataset 115, according to embodiments of the present disclosure. A system 100 may receive a dataset 115 containing speech samples of a target voice (e.g., a character voice to be reproduced by a TTS system), and generate a larger, augmented speech dataset 125. For example, the target speech dataset 115 may contain as little as a few minutes of speech samples (e.g., "prompts"), which the system 100 may, subject to user permissions and/or verification of the target voice, use to generate several hours of speech samples (e.g., "continuations") having voice characteristics similar to those of the target speech. Use of the ASLM 140 is not limited to human speech, however. In some implementations, the ASLM 140 may be trained and/or used to replicate non-human speech such as synthesizes speech (e.g., to imitate a computer-generated and/or synthesized character voice). In some implementations, the ASLM 140 may be trained and/or used to generate non-speech vocalizations such as sighs, humming, crying, laughing, gasps, etc. In some implementations, the ASLM 140 may be trained and/or used to generate other forms of audio data including vocalization of animals (e.g., whale song), instrumental music, factory machinery, etc.

An ASLM 140 may receive a prompt and generate a continuation of the speech in the prompt. For example, a speech prompt may be "Once upon a time," for which the ASLM 140 may output a continuation such as "in a land far away." In some implementations, the ASLM 140 may generate additional continuations for the prompt (e.g., "is how stories begin," "and they lived happily ever after," "a girl with moonlight in her eyes," etc.). In some implementations, the ASLM 140 may extend a continuation by predicting additional speech based on previously predicted speech. The ASLM 140 may predict speech using techniques and/or models similar or analogous to those used in the field natural language processing; for example, by predicting speech in a manner similar to how a speech processing language model predicts phonemes/words. The ASLM 140, however, may receive and process data in the form of encoded speech units. An encoded speech unit may be data that includes various information about a speech sample including semantic information as well as acoustic information. The semantic information may be information about the language embodied in the speech; for example, as could be represented by a text or phonetic transcript. The acoustic information (e.g., feature data) may include indications of, for example, pitch or timbre, emotion (e.g., surprised, amused, etc.), speaking style (e.g., news anchor, sports commentary, storytelling, etc.), and/or identity (e.g., features corresponding to a particular user or celebrity), etc. Thus, when the ASLM 140 predicts a continuation of a prompt, the continuation may be encoded with acoustic information consistent with that of the prompt. For example, if the prompt reflects a particular speaker identity (e.g., voice characteristics corresponding to a particular user, character, celebrity, etc.), speaking style, and/or emotion, etc., so will the continuation.

Encoded speech unit data may correspond to phonemes; that is, one or several encoded speech units may represent a single phoneme (or vice versa). In some implementations, an encoded speech unit may be a chunk of data—for example, but not necessarily, of a pre-defined fixed size-correspond to a part, a whole, and/or multiple phonemes. In some implementations, ASR may be used to determine which phoneme likely corresponds to certain frames of audio data. A speech unit encoder 130 may process frames of audio data (e.g., spectrograms) to generate encoded speech unit data, and the ASR output data may be used to determine which encoded speech units correspond to which phonemes. The encoded speech unit data may be downsampled from, for example, the output of the speech unit encoder 130 (e.g., at a frequency/cadence of audio frames and/or spectrograms), and aligned with phonemes. In this manner, the system may enforce a correspondence between an encoded speech unit (or multiple encoded speech units) and a single phoneme. In some implementations, encoded speech unit data may be a stream of data. Encoded speech unit data may be generated from audio data by an encoder such as the speech unit encoder 130 described further below. A decoder, such as the speech unit decoder 150 described below, may generate audio data from encoded speech units.

In the example system 100 shown in FIG. 1, the ASLM 140 may receive encoded speech units $EU_0, EU_1, EU_2, \ldots EU_n$. The encoded speech units $EU_i$ may represent, for example, a speech prompt stating, "Hello, how may." The ASLM 140 may, based on the received encoded speech units, predict subsequent encoded speech units $EU'_{n+1}, EU'_{n+2}, EU'_{n+3}, EU'_{n+4}, EU'_{n+5}, \ldots EU'_{n+m}$. The predicted encoded speech units $EU'_i$ may represent, for example, a speech continuation stating, "I help you today?" In addition to representing semantically consistent speech, the predicted continuation may also represent consistent acoustic features, such as the style of speaking, voice characteristics, etc. The ASLM 140 may repeat the process for the same and/or additional prompts in the target speech dataset 115, and may also predict further continuations of speech from previous predicted speech. Thus, the ASLM 140 may generate m new encoded speech units and increase the TTS training dataset from a size corresponding to n encoded speech units to n+m encoded speech units.

In some implementations, the ASLM 140 may predict multiple continuations from a single prompt. For example, the ASLM 140 may employ techniques that introduce randomness and/or diversity into the encoded speech unit prediction process. This may result in the ASLM 140 possibly selecting different encoded speech units for a predicate encoded speech unit sequence. The different continuations may still reflect the voice characteristics of the prompt, making them useful for training a TTS model to reproduce similar voice characteristics. In some implementations, data augmentation can be improved by employed additional techniques. For example, continuations can be generated conditionally such that the augmented dataset covers linguistic contexts useful for a given application. Additionally or alternatively, automated and/or manual data selection can be applied to, for example, remove generated continuations having poor quality and/or intelligibility. In some implementations, the data augmentation techniques described herein may be combined with other data augmentation approaches.

The ASLM 140 may be a computer model/machine learning model such as a neural network. In some implementations, the ASLM 140 may have one or more neural layers. In some implementations, the ASLM 140 may be a 24-layer neural network model. In some implementations, the ASLM 140 may be a transformer model. In some implementations, the ASLM 140 may be an autoregressive transformer model. The ASLM 140 may predict a next encoded speech unit in a sequence of encoded speech units. In some cases, the ASLM 140 may predict a next encoded speech unit based on receiving an indication to begin generating an output; for example, receiving a start token. The ASLM 140 may generate an output based on its own previous output as well as a stochastic term; for example, the model may be in the form of a stochastic difference equation or recurrence relation.

The ASLM 140 may be trained using sequences of encoded speech units. For example, for a sequence encoded speech units $EU_0, EU_1, EU_2, \ldots EU_n$, the ASLM 140 may be trained to predict each subsequent encoded speech unit based on the preceding encoded speech units. For example, the ASLM 140 may predict $EU'_1$ based on $EU_0$, predict $EU'_2$ based on $EU_0$ and $EU_1$, etc. A component such as a comparator may determine an error between each predicted encoded speech unit $EU'_i$ and the actual encoded speech unit $EU_i$. Training of the ASLM 140 is described in additional detail below with reference to FIG. 3.

The speech unit encoder 130 may generate the encoded speech units to be used for training the ASLM 140 and/or predicting new encoded speech units to be used for TTS training. The speech unit encoder 130 may be a neural network model such as a convolutional neural network (CNN) and/or recursive neural network (RNN). The speech unit encoder 130 may have one or more neural network layers and/or cells. An architecture of the speech unit encoder 130 may be described by hyperparameters (e.g., describing the number of layers, connections between layers/cells, activation functions, etc.). The speech unit encoder 130 may include parameters (e.g., weights) which represent trainable values that may be iteratively adjusted during training operations to achieve a desired functionality. For example, the speech unit encoder 130 may be trained to extract certain information from audio data and encode it into encoded speech units, where the extracted/encoded information represents features relevant to the task to be performed; in this case, semantic and/or acoustic information about speech samples. The speech unit encoder 130 may receive speech samples in the form of, for example, Mel-spectrograms, or other spectrogram data formats. In some implementations, other time- and/or frequency-domain audio data formats may be used. The speech unit encoder 130 may output encoded speech units, which may be used by the ASLM 140 to generate new encoded speech units representing a continuation of a speech prompt, and/or used by the speech unit decoder 150 to generate audio data.

The speech unit decoder 150 may process encoded speech units (e.g., received from the speech unit encoder 130 and/or the ASLM 140) and generate audio data representing speech corresponding to the encoded speech units. The audio data generated by the speech unit decoder 150 may be used to, for example, build or augment a dataset of sample speech to be used for TTS training. The speech unit decoder 150 may be a neural network model such as a CNN and/or RNN. The speech unit decoder 150 may have one or more neural network layers and/or cells. An architecture of the speech unit decoder 150 may be described by hyperparameters (e.g., describing the number of layers, connections between layers/cells, activation functions, etc.). The speech unit decoder 150 may include parameters (e.g., weights) which represent trainable values that may be iteratively adjusted during training operations to achieve a desired functionality. For example, the speech unit decoder 150 may be trained to generate audio data that accurately reflects semantic and/or feature information encoded in the encoded speech units. The speech unit decoder 150 may generate audio data in the form of, for example, Mel-spectrograms, or other spectrogram data formats. In some implementations, other time- and/or frequency-domain audio data formats may be used. The speech unit decoder 150 may output audio data representing speech samples (e.g., prompts and/or continuations) to be used for training a TTS model. While the speech unit decoder 150 may appear analogous to a TTS model in that it receives a form of data representing speech and generates audio data, the speech unit decoder 150 may be distinguished from TTS techniques because TTS typically receives word token or phoneme data (and, in some cases, conditioning data related to desired voice characteristics) and generates synthesized speech, whereas the speech unit decoder 150 receives encoded speech unit data that contains a much richer representation of speech and which may not map one-to-one to particular phonemes and/or words. Training of the speech unit encoder and decoder are described in additional detail below with reference to FIG. 2.

Figure 2:
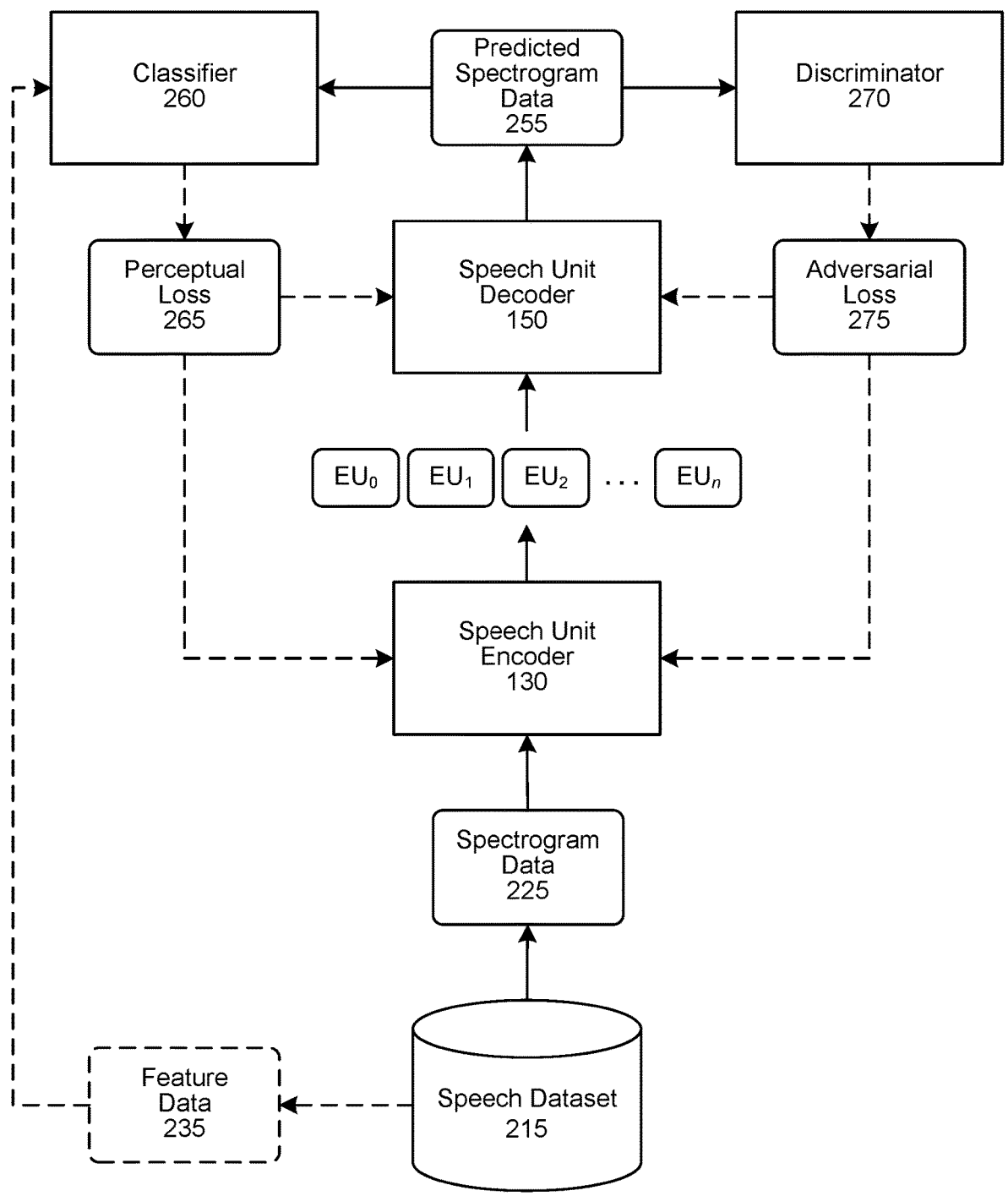
FIG. 2 is a conceptual diagram that illustrates training a speech unit encoder and a speech unit decoder to process encoded speech units for use with the ASLM, according to embodiments of the present disclosure.

FIG. 2 is a conceptual diagram that illustrates training the speech unit encoder 130 and the speech unit decoder 150 to process encoded speech units for use with the ASLM 140, according to embodiments of the present disclosure. The speech unit encoder 130 and/or the speech unit decoder 150 may be trained using a combination of metrics to achieve the desired functionality. For example, the system may employ a measure of perceptual loss to gauge how effectively the speech unit encoder 130 and/or the speech unit decoder 150 extract and reproduce semantic information and feature data from the audio data, while ignoring (or reducing the influence of) channel noise or other extraneous data. The system may also employ a measure of adversarial loss to determine whether the audio data represents the correct distribution. For example, the adversarial loss may be based on whether the system can distinguish the generated audio data from natural (e.g., not synthesized) audio data containing speech—in other words, the system may determine whether the generated audio data "looks like" real audio data.

In some implementations, the speech unit encoder 130 and/or the speech unit decoder 150 may have a configuration similar to, for example, a vector quantized-variational auto-encoder (VQ-VAE), which is a generative model useful for generating images, videos, and speech. The speech unit encoder 130 and/or the speech unit decoder 150 may be trained to process audio data; for example, in the form of Mel-spectrograms. The speech unit encoder 130 and/or the speech unit decoder 150 can be trained to learn phoneme-level representations of speech represented in the audio data. In some implementations, the training technique may be similar to that used for a vector quantized-generative adversarial network (VQ-GAN).

In an example operation, the speech unit encoder 130 may receive speech samples in the form of audio data (e.g., spectrogram data 225) from a speech dataset 215. The speech dataset 215 may contain the same and/or similar speech samples as those in the target speech dataset 115. The speech unit encoder 130 may process the spectrogram data 225 and generate encoded speech units $EU_0$, $EU_1$, $EU_2$, . . . $EU_n$. The speech unit decoder 150 may process the encoded speech units to generate predicted spectrogram data 255. The predicted spectrogram data 255 may be analyzed by a classifier 260 to determine perceptual loss 265, and by a discriminator 270 to determine adversarial loss 275. The perceptual loss 265 and/or the adversarial loss 275 may be used to train (e.g., update the parameters of) the speech unit encoder 130 and/or the speech unit decoder 150.

The classifier 260 may be an auxiliary network used to analyze the predicted spectrogram data 255 and determine semantic and/or feature data of the predicted spectrogram data 255. The classifier 260 may be, for example, a neural network. The classifier 260 may include one or more convolutional layers which may compress received data into, for example, vectors from which semantic information, phoneme content, prosody, timbre, speaking identity, speaking style, emotion, etc., can be predicted. One or more output layers may receive the vector data and make the classifications. The classifier 260 may process the predicted spectrogram data 255 and predict phonemes and/or text data representing semantic information in the predicted spectrogram data 255. In some implementations, the classifier 260 may classify the predicted spectrogram data 255 into one or more categories based on feature data, such as a determination of speaker identity (e.g., similar to techniques used for user recognition as described herein), a detected emotion and/or speaking style, prosody, timbre, etc., by comparing predicted feature data with feature data 235 annotated in and/or extracted from the speech dataset 215. The classifier 260 may compare the detected/determined information with transcripts and/or annotations contained in and/or derived from the speech dataset 215. An error between the information determined from the predicted spectrogram data 255 and the target data in the speech dataset 215 may be represented by the perceptual loss 265. The perceptual loss 265 may be used to train the speech unit encoder 130 and/or speech unit decoder 150 using, for example, a combination of stochastic gradient descent and/or backpropagation techniques.

The classifier 260 may be used to train the speech unit encoder 130 and/or the speech unit decoder 150 in a supervised manner using annotations from the speech dataset 215. Thus, rather than training the speech unit encoder 130 and the speech unit decoder 150 based on, for example, a pixel-by-pixel loss from a direct comparison of the spectrogram data 225 and the predicted spectrogram data 255, the system can be trained based on improving the ability of the classifier 260 to determine accurate semantic and feature data from the predicted spectrogram data 255 (e.g., prosody, content, speaker identity, timbre, etc.), while ignoring extraneous data such as channel noise and/or noise from surroundings (e.g., echoes, background conversation, etc.). In some implementations, the system may train the speech unit encoder 130 and/or the speech unit decoder 150 based on, for example, an L1 loss between the classifier 260 predictions and the annotations in the speech dataset 215. The speech unit encoder 130 and/or the speech unit decoder 150 can thus be trained to encode and reproduce relevant data into and from encoded speech units, while ignoring irrelevant data.

The discriminator 270 may be another auxiliary network used to analyze the predicted spectrogram data to determine, for example, how "realistic" it is; that is, whether it represents a good distribution. The discriminator 270 may be, for example, a neural network such as a CNN and/or RNN as used in, for example, a generative adversarial network. In some implementations, independent backpropagation operations are applied to the classifier 260 and discriminator 270, respectively.

Figure 3:
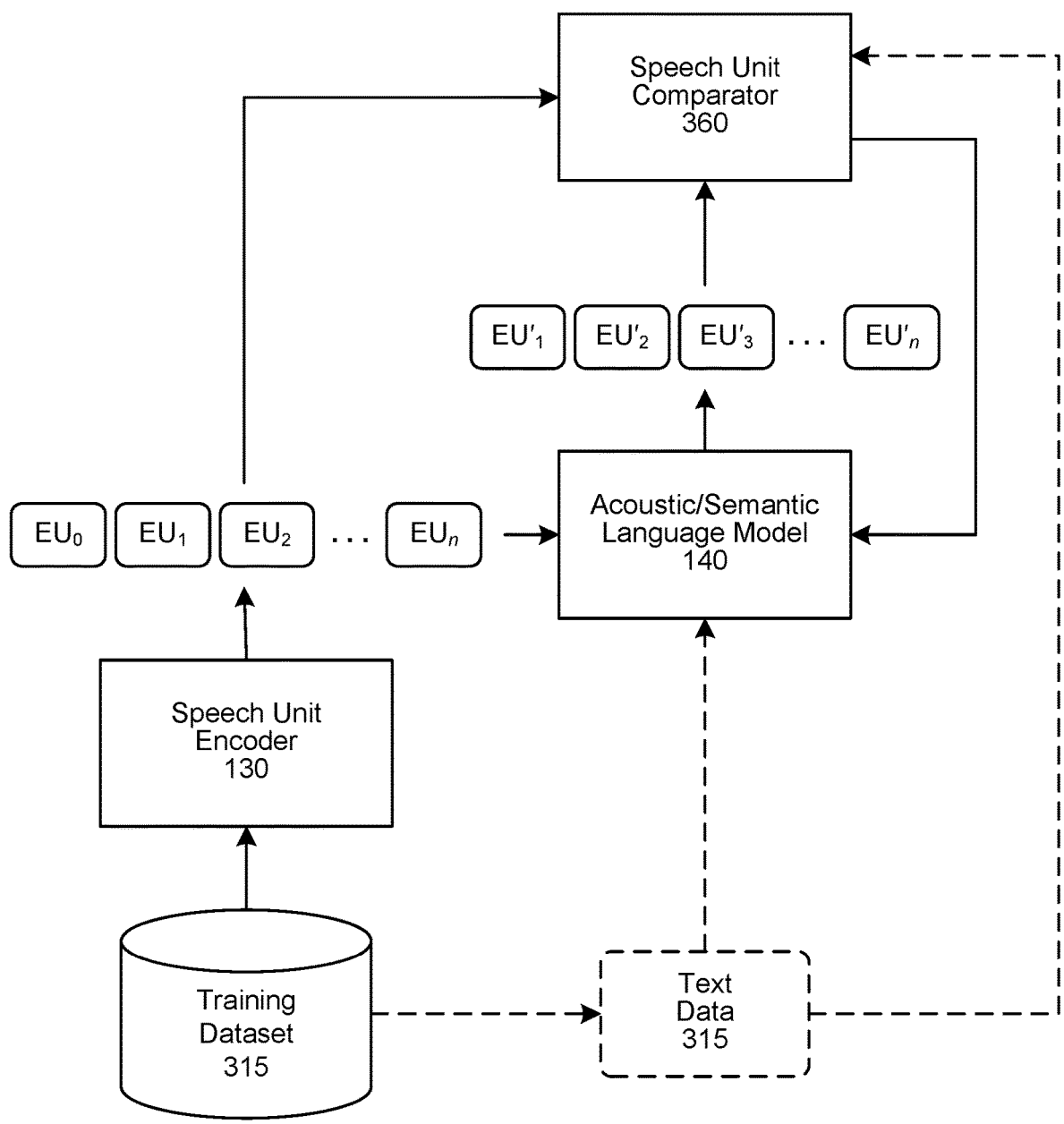
FIG. 3 is a conceptual diagram that illustrates operations for training the ASLM to predict encoded speech units, according to embodiments of the present disclosure.

FIG. 3 is a conceptual diagram that illustrates operations for training the ASLM 140 to predict encoded speech units, according to embodiments of the present disclosure. The ASLM 140 may be trained to predict one or more subsequent encoded speech units based a series of on one or more encoded speech units, or a batch of such series. In some implementations, the ASLM 140 may be trained to receive and/or predict other forms of data; for example, text, phoneme data, unencoded audio data and/or other types of sequential data. In some implementations, the ASLM 140 may be an autoregressive transformer model. In some implementations, the training may be similar or analogous to the training used for the generative pre-trained transformer 2 (GPT-2) model and/or similar models. Training may be performed in an unsupervised manner using encoded speech units representing a large and/or diverse dataset (e.g., representing 10, 100, or 1,000 hours of speech or more).

The ASLM 140 may generate predictions in the form of a distribution. For example, the ASLM 140 may, at each time step, predict a distribution over, 1,024 units. For each unit, the ASLM 140 may assign a number between, for example, zero and one. The numbers assigned to all units may sum to one. During training, the encoded speech unit comparator 360 may determine an error between the output distribution represented by the predicted encoded speech unit $EU'_i$ and the actual next encoded speech unit $EU_i$ (which may, for example, have a 1 assigned to the proper unit and a zero everywhere else).

During decoding, the speech unit decoder 150 may perform a technique such as a beam search, and may balance between a quality of predictions and diversity of output. For example, the speech unit decoder 150 may be trained to always select the most likely encoded speech unit; however, the resulting speech may lack diversity and thus sound unnatural. One approach for balancing diversity and prediction quality is to sample from a distribution to select an encoded speech unit.

In some implementations, the ASLM 140 may be pre-trained using text data 315, and then fine-tuned using encoded speech unit data generated by the speech unit encoder 130 from speech in the training corpus (e.g., the training dataset 315). The text data 315 may represent annotations (e.g., a machine and/or human transcription) in the form of text, tokens, phonemes, etc. In some implementations, the ASLM 140 may be conditioned on words and/or phonemes (e.g., semantic information) to control the content of the predicted encoded speech units in the continuation.

Pre-training and/or conditioning using phonemes may enable the ASLM 140 to capture syntax and/or semantic of text, and allow it to make better predictions of words that are likely to follow preceding words. When fine-tuned with encoded speech unit data, the ASLM 140 can learn voice characteristics and speech styles while preserving the syntactical and semantic knowledge gained during pre-training. In some implementations, the ASLM 140 may be fine-tuned using a gradual approach in which, over multiple training epochs, a certain percentage M % of phonemes may be replaced with encoded speech unit data. In some implementations, the fine-tuning may be conditioned on a token that represents M for that training epoch.

Figure 4:
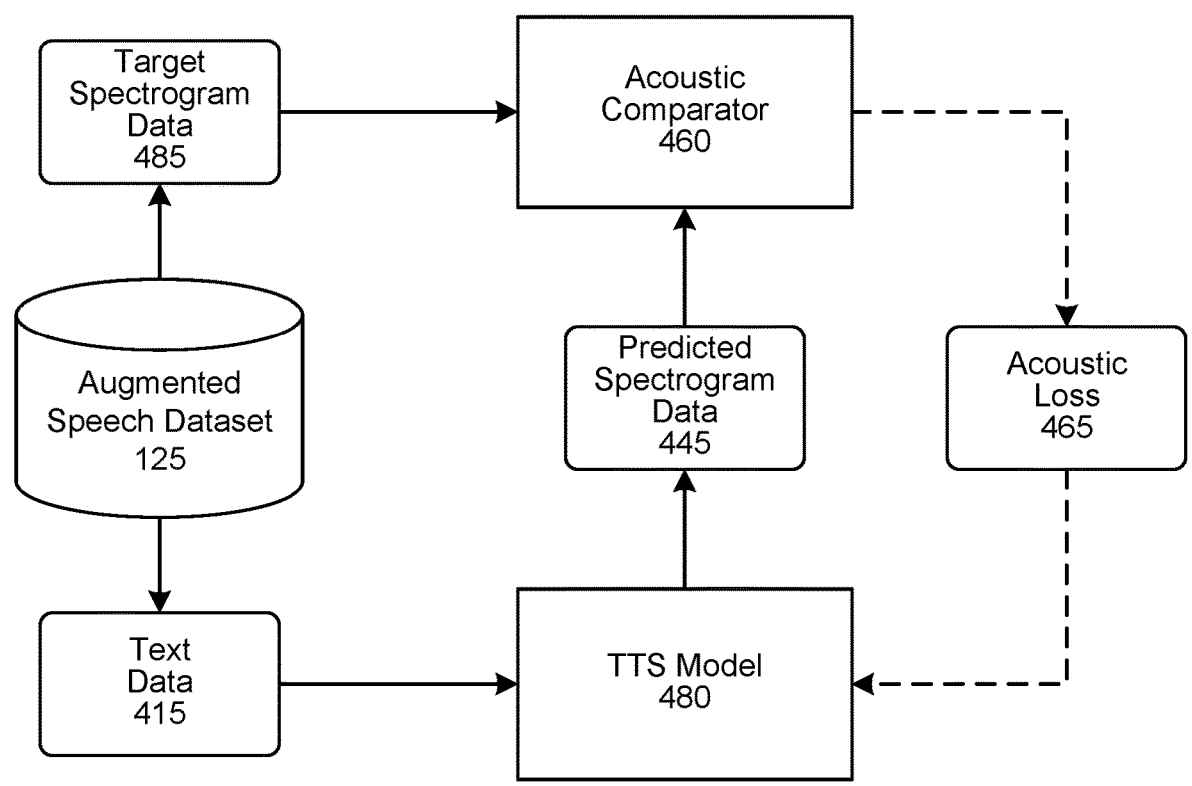
FIG. 4 is a conceptual diagram that illustrates operations for training a TTS model using an augmented speech dataset generated by the system, according to embodiments of the present disclosure.

Once trained, the ASLM 140 and the speech unit decoder 150 could be used as a TTS system by receiving encoded speech units converted from phonemes and outputting audio data. However, the models may be quite large (e.g., having many layers and/or parameters), and would thus require a lot of compute and/or memory resources to run, making them unsuitable or impractical for many TTS applications. The system 100 may be used to augment limited datasets to generate larger training sets sufficient for training a TTS model to produce synthesized speech having good quality and intelligibility. FIG. 4

FIG. 4 is a conceptual diagram that illustrates operations for training a TTS model 480 using an augmented speech dataset 125 generated by the system 100, according to embodiments of the present disclosure. The TTS model 480 may be, for example, an acoustic model configured to generate spectrogram data based on text and/or phoneme data. The TTS model 480 may be, for example, a neural network or made up of multiple neural networks. In some implementations, the TTS model 480 may be an RNN. In some implementations, the TTS model 480 may be an autoregressive model. In some implementations, the TTS model 480 may have its own encoder/decoder architecture, and may include a self-attention mechanism. In some implementations, the TTS model 480 may have a transformer architecture. In some implementations, the TTS model 480 may be a flow-based model.

Typically, a TTS model requires several to many hours of high quality audio representing speech for training; however, using the techniques described herein, the TTS model 480 may be trained to reproduce a target voice based a limited sample set by augmenting the target voice dataset using the system 100. Once the augmented speech dataset 125 has been generated, text data 415 may be extracted and provided to the TTS model 480. The text data 415 may represent annotations (e.g., a machine and/or human transcription) in the form of text, tokens, phonemes, etc. The TTS model 480 may process the text data 415 to generate predicted spectrogram data 445. An acoustic comparator 460 may compare the predicted spectrogram data 445 with target spectrogram data 485 in the augmented speech dataset 125. The acoustic comparator 460 may determine an acoustic loss 465 (e.g., an L1 loss) between the predicted spectrogram data 445 and the target spectrogram data 485. The acoustic loss 465 may be used to update parameters of the TTS model 480; for example, through a combination of stochastic gradient descent and/or backpropagation. The TTS model 480 thus trained may, in conjunction with a vocoder, reproduce the target voice as illustrated in FIG. 5 and described below.

Figure 5:
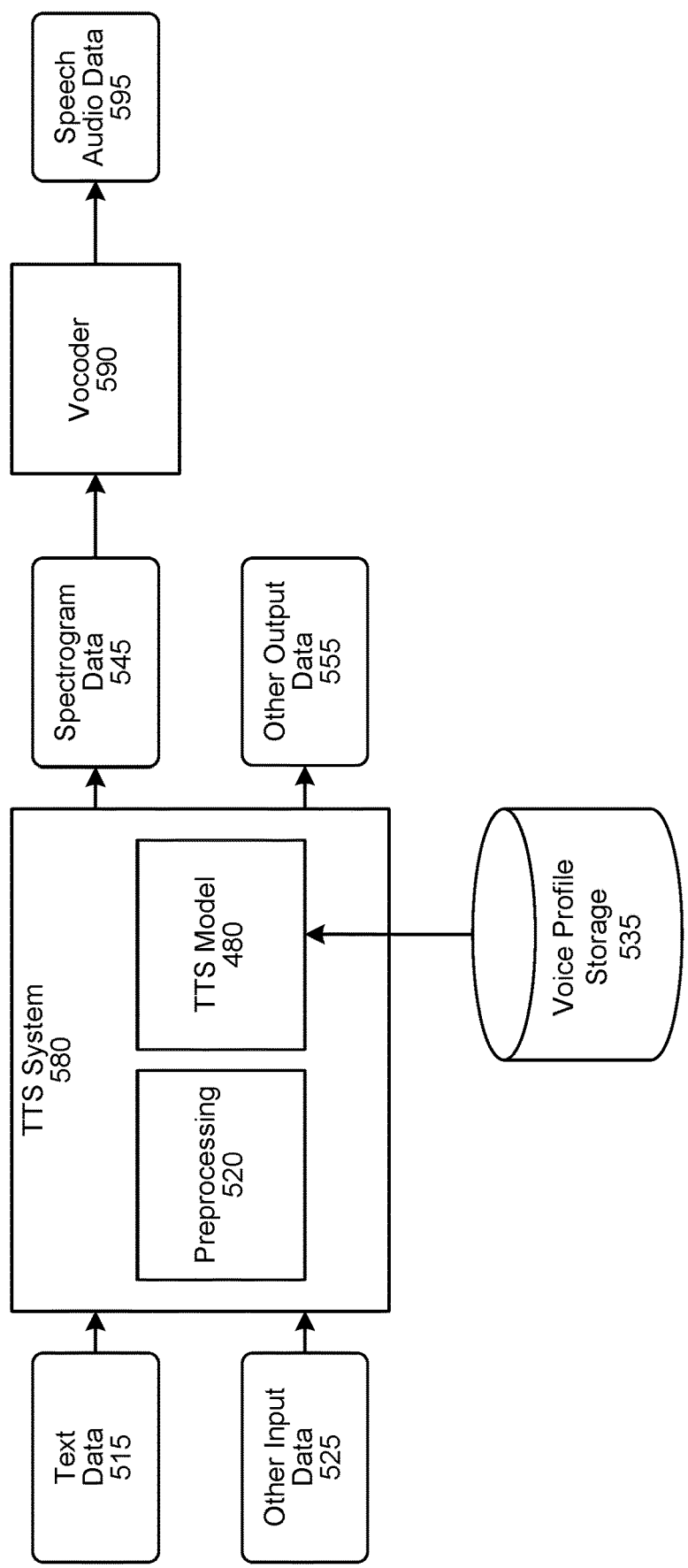
FIG. 5 is a conceptual diagram that illustrates operations for generating synthesized speech using a text-to-speech system, according to embodiments of the present disclosure.

FIG. 5 is a conceptual diagram that illustrates operations for generating synthesized speech using a TTS system 580, according to embodiments of the present disclosure. The TTS system 580 may receive text data 515 and process it using one or more TTS models 480 to generate synthesized speech in the form of spectrogram data 545. A vocoder 590 may convert the spectrogram data 545 into output speech audio data 595, which may represent a time-domain waveform suitable for amplification and output as audio (e.g., from a loudspeaker).

The TTS system 580 may additionally receive other input data 525. The other input data 525 may include, for example, identifiers and/or labels corresponding to a desired speaker identity, voice characteristics, emotion, speech style, etc. desired for the synthesized speech. In some implementations, the other input data 525 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 515 and/or the other input data 525 such as metadata accompanying a TTS request and indicating what text should be whispered (or have some other indicated audio characteristic).

The TTS system 580 may include a preprocessing component 520 that can convert the text data 515 and/or other input data 525 into a form suitable for processing by the TTS model 480. The text data 515 may be from, for example an application, a skill component (described further below), an NLG component, another device or source, or may be input by a user. The text data 515 received by the TTS system 580 may not necessarily be text, but may include other data (such as symbols, code, other data, etc.) that may reference text (such as an indicator of a word and/or phoneme) that is to be synthesized. The preprocessing component 520 may transform the text data 515 into, for example, a symbolic linguistic representation, which may include linguistic context features such as phoneme data, punctuation data, syllable-level features, word-level features, and/or emotion, speaker, accent, or other features for processing by the TTS system 580. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 515, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 520 may include functionality and/or components for performing text normalization, linguistic analysis, linguistic prosody generation, or other such operations. During text normalization, the preprocessing component 520 may first process the text data 515 and generate standard text, converting such things as numbers, abbreviations (such as Apt., St., etc.), symbols ($, %, etc.) into the equivalent of written out words.

During linguistic analysis, the preprocessing component 520 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 480 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 520 may also identify different grammatical components such as prefixes, suffixes, phrases, punctuation, syntactic boundaries, or the like. Such grammatical components may be used by the TTS system 580 to craft a natural-sounding audio waveform output. The language dictionary may also include letter-to-sound rules and other tools that may be used to pronounce previously unidentified words or letter combinations that may be encountered by the TTS system 580. Generally, the more information included in the language dictionary, the higher quality the speech output.

The output of the preprocessing component 520 may be a symbolic linguistic representation, which may include a sequence of phonetic units. In some implementations, the sequence of phonetic units may be annotated with prosodic characteristics. In some implementations, prosody may be applied in part or wholly by a TTS model 480. This symbolic linguistic representation may be sent to the TTS model 480 for conversion into audio data (e.g., in the form of Mel-spectrograms or other frequency content data format).

The TTS system 580 may retrieve one or more previously trained and/or configured TTS models 480 from the voice profile storage 535. A TTS model 480 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 480 may be stored in the voice profile storage 535. A TTS model 480 may represent a particular speaker identity and may be conditioned based on speaking style, emotion, etc. In some implementations, a particular speaker identity may be associated with more than one TTS model 480; for example, with a different model representing a different speaking style, language, emotion, etc. in some implementations, a particular TTS model 480 may be associated with more than one speaker identity; that is, be able to produce synthesized speech that reproduces voice characteristics of more than one character. In some cases, the TTS model 480 may generate the desired voice characteristics based on conditioning data received or determined from the text data 515 and/or the other input data 525.

The TTS system 580 may, based on an indication received with the text data 515 and/or other input data 525, retrieve a TTS model 480 from the voice profile storage 535 and use it to process input to generate synthesized speech. The TTS system 580 may provide the TTS model 480 with any relevant conditioning labels to generate synthesized speech having the desired voice characteristics. The TTS model 480 may generate spectrogram data 545 (e.g., frequency content data) representing the synthesized speech, and send it to the vocoder 590 for conversion into an audio signal.

The TTS system 580 may generate other output data 555. The other output data 555 may include, for example, indications or instructions for handling and/or outputting the synthesized speech. For example, the text data 515 and/or other input data 525 may be received along with metadata, such as SSML tags, indicating that a selected portion of the text data 515 should be louder or quieter. Thus, the other output data 555 may include a volume tag that instructs the vocoder 590 to increase or decrease an amplitude of the output speech audio data 595 at times corresponding to the selected portion of the text data 515. Additionally or alternatively, a volume tag may instruct a playback device to raise or lower a volume of the synthesized speech from the device's current volume level, or lower a volume of other media being output by the device (e.g., to deliver an urgent message).

The vocoder 590 may convert the spectrogram data 545 generated by the TTS model 480 into an audio signal (e.g., an analog or digital time-domain waveform) suitable for amplification and output as audio. The vocoder 590 may be, for example, a universal neural vocoder based on Parallel WaveNet or related model. The vocoder 590 may take as input audio data in the form of, for example, a Mel-spectrogram with 80 coefficients and frequencies ranging from 50 Hz to 12 kHz. The speech audio data 595 may be a time-domain audio format (e.g., pulse-code modulation (PCM), waveform audio format (WAV), μ-law, etc.) that may be readily converted to an analog signal for amplification and output by a loudspeaker, such as the loudspeaker 614 shown in FIGS. 6 and 13. The speech audio data 595 may consist of, for example, 8-, 16-, or 24-bit audio having a sample rate of 16 kHz, 24 kHz, 44.1 kHz, etc. In some implementations, other bit and/or sample rates may be used.

Figure 6:
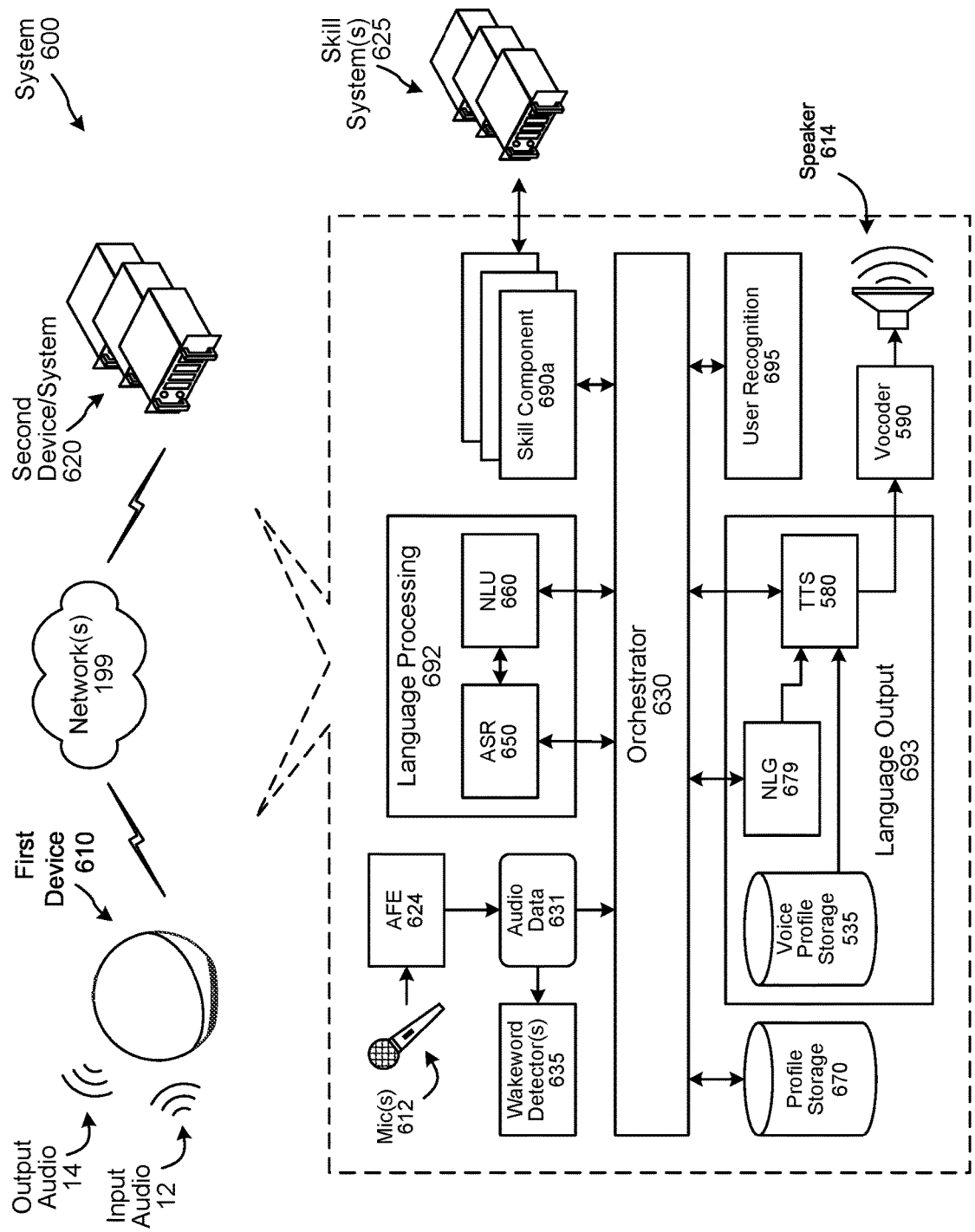
FIG. 6 is a conceptual diagram of components of the system, according to embodiments of the present disclosure.

FIG. 6 is a conceptual diagram illustrating a high level overview of example components of the system 600 including features for processing natural language commands and/or responding with synthesized speech, according to embodiments of the present disclosure. In addition to the components previously described in the context of training and using TTS models, the system 600 may include components for performing speech processing and responding to natural language commands. The system 600 may include a wakeword detector 635, an orchestrator component 630, a profile storage 670, language processing components 692 including an ASR component 650 and an NLU component 660, and/or one or more skill components 690*a*, 690*b*, 690*c*, etc. (collectively "skill components 690"), which may be in communication with one or more skill support systems 625. In addition, the system 600 may include language output components 693 such as an NLG component 679, the TTS system 580, and the voice profile storage 535. The language output components 693 may also include, or be in communication with, a vocoder 590. The system 600 may provide output to a user in the form of synthesized speech, notification sounds, or other output audio 14 via one or more loudspeakers 614.

The components may reside in the device 610 and/or second device/system 620 such that various functionality described herein may be performed by the device 610, the second device 620, or may be divided or shared between the two. For example, in some cases, the device 610 may process audio data locally, whereas in other cases the device 610 may send audio data to the system 620 for processing. In some implementations, the first device 610 may perform initial processing of audio and/or other input data, and send a form of intermittent data to the second device/system 620. The intermittent data may include ASR data (such that audio data including a user's voice need not be sent from the user's device 610), update data pertaining to various models used by the first device 610, and/or commands to skill components 690, etc.

The system 600 may receive input audio 12 via a microphone or microphone array 612. An acoustic front end (AFE) 624 may process the audio signal from the microphone(s) 612 to generate audio data 631. In some implementations, the system 600 may include multiple AFEs 624. For example, the AFE 624 providing audio data 631 to an acoustic event detection (AED) component may differ from the AFE 624 providing audio data to the wakeword detector 635. This may be due to the AED components having a different context window from the wakeword detector 635. For example, the wakeword acoustic-feature data may correspond to three seconds of audio data, while the AED acoustic-feature data may correspond to ten seconds of audio data.

The system 600 may process the audio data 631 to determine whether speech is represented therein. The system 600 may use various techniques to determine whether the input audio data 631 includes speech. In some examples, a voice-activity detector may apply voice-activity detection (VAD) techniques. Such VAD techniques may determine whether speech is present in audio data 631 based on various quantitative aspects of the input audio data 631, such as the spectral slope between one or more frames of the audio data; the energy levels of the audio data in one or more spectral bands; the signal-to-noise ratios of the audio data in one or more spectral bands; or other quantitative or qualitative aspects. In other examples, the system 600 may include a classifier configured to distinguish speech from background noise. The classifier may be implemented by techniques such as linear classifiers, support vector machines, and decision trees. In still other examples, the system 600 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 635 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 635 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the wakeword detector(s) 635 may use one of a plurality of wakeword-detection models. Each model may be trained to detect a different wakeword. In some embodiments, a single model may detect multiple wakewords. Each wakeword may be associated with a different speech-processing system and/or different speech-processing system configurations (e.g., representing different virtual assistants available to the user via the system 600). Upon detection of a particular wakeword, the system 600 may process the audio data 631 by the corresponding speech-processing system configuration.

In various embodiments, the wakeword-detection model of the wakeword detector(s) 635 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 635 may determine a similarity score for the candidate wakeword based on how similar it is to the stored wakeword; if the similarly score is higher than the wakeword-detection threshold, the wakeword detector 635 may determine that the wakeword is present in the audio data, and if the similarity score is less than the wakeword-detection threshold, the wakeword detector 635 may determine that the wakeword not is present in the audio data. For example, if the candidate wakeword matches the stored wakeword very closely, the wakeword detector 635 may determine a similarity score of 100; if the candidate wakeword does not match the stored wakeword at all, the wakeword detector 635 may determine a similarity score of 0. If the wakeword detector 635 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Once a wakeword is detected by the wakeword detector(s) 635, the system 600 may begin processing speech represented in the audio data 631. The system 600 may send the audio data 631 to an orchestrator component 630. The orchestrator component 630 may include memory and logic that enables it to transmit various pieces and forms of data to various components of the system, as well as perform other operations as described herein. The orchestrator component 630 may be or include a speech-processing system manager, which may be used to determine which, if any, of the language processing components 692, language output components 693, and/or skill components 690 should receive and/or process the audio data 631 and/or data derived therefrom (e.g., by ASR, NLU, and/or entity resolution).

In some embodiments, the orchestrator component 630 and/or speech-processing system manager communicate with the language processing components 692 using an application programming interface (API). The API may be used to send and/or receive data, commands, or other information to and/or from the language processing components 692. For example, the orchestrator component 630 may send, via the API, the input audio data 631 to language processing components 692 elected by the speech-processing system manager and may receive, from the selected language processing components 692, a command and/or data responsive to the audio data 631.

The language processing components 692 may include an ASR component 650, which may transcribe the input audio data 631 into text data. The text data output by the ASR component 650 may represent one or more than one (e.g., in the form of an N-best list) ASR hypotheses representing speech represented in the input audio data 631. The ASR component 650 may interpret the speech in the input audio data 631 based on a similarity between the audio data 631 and pre-established language models. For example, the ASR component 650 may compare the input audio data 631 with models for sounds (e.g., acoustic units such as phonemes, senons, phones, etc.) and sequences of sounds to identify words that match the sequence of sounds of the speech represented in the input audio data 631. The ASR component 650 may the text data generated thereby to an NLU component 660, via, in some embodiments, the orchestrator component 630. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein. The ASR component 650 is described in additional detail below with reference to FIG. 8.

Figure 9:
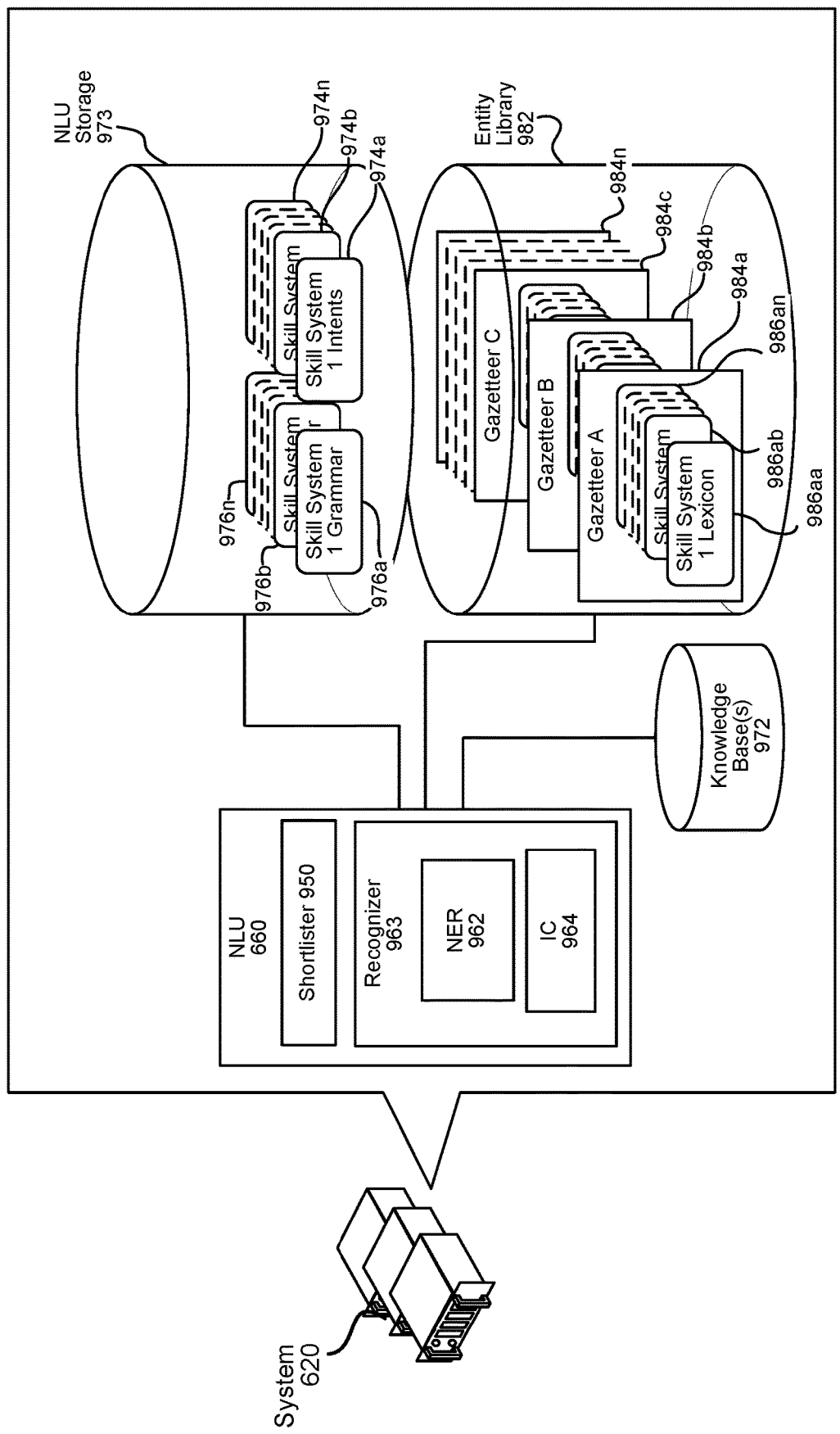
FIG. 9 is a conceptual diagram of how natural language processing is performed, according to embodiments of the present disclosure.
Figure 10:
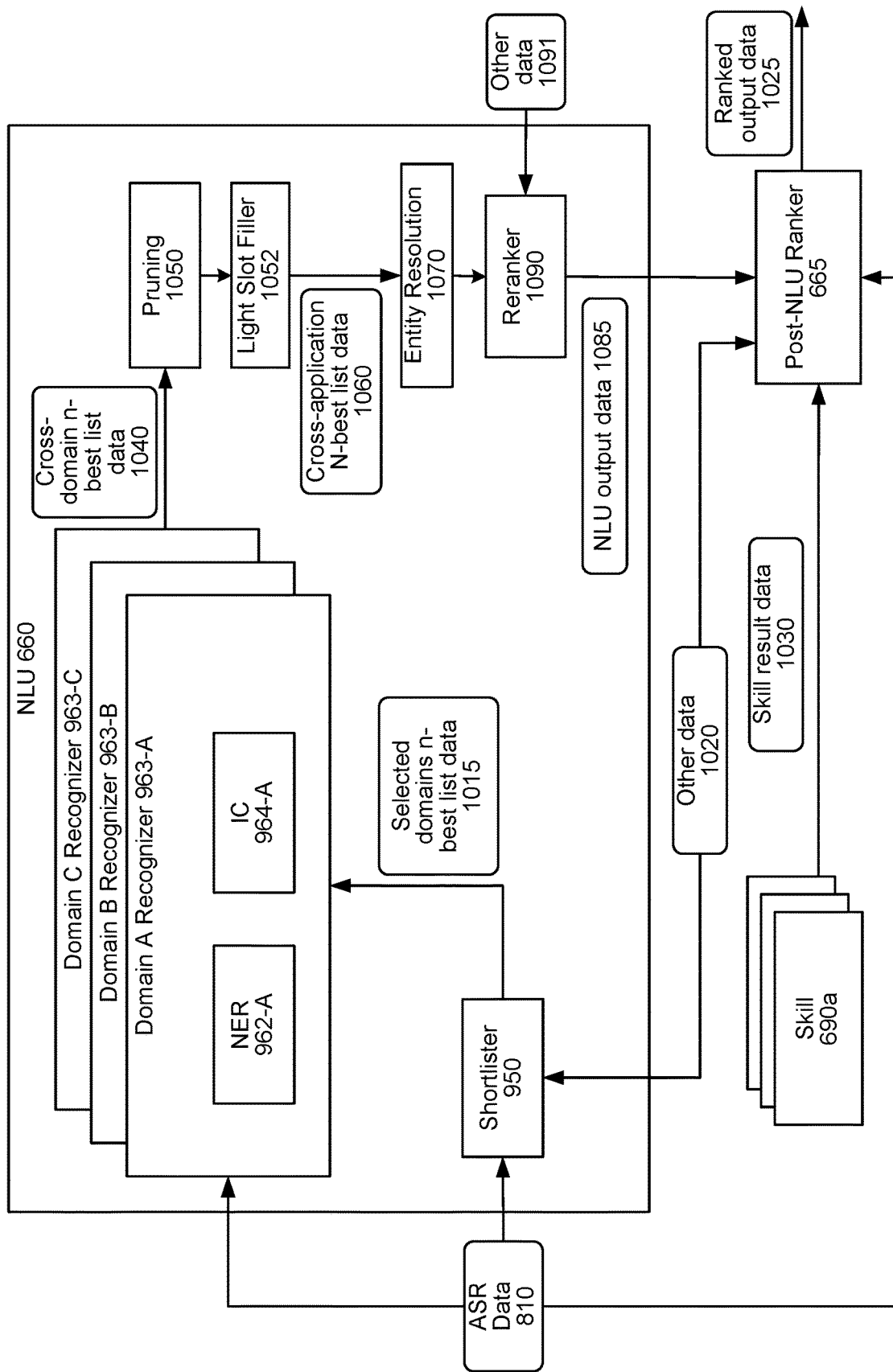
FIG. 10 is a conceptual diagram of how natural language processing is performed, according to embodiments of the present disclosure.

The language processing components 692 may further include a NLU component 660, which is shown in greater detail in FIGS. 9 and 10, that attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the user device 610, the system(s) 620, a skill component 690, a skill system(s) 625, etc.) to execute the intent. For example, if the text data corresponds to "play Africa by Toto," the NLU component 660 may determine an intent that the system output music and may identify "Toto" as an artist and "Africa" as the song. For further example, if the text data corresponds to "what is the weather," the NLU component 660 may determine an intent that the system output weather information associated with a geographic location of the user device 610. In another example, if the text data corresponds to "turn off the lights," the NLU component 660 may determine an intent that the system turn off lights associated with the user device 610 or its user.

The NLU results data may be sent (via, for example, the orchestrator component 630) from the NLU component 660

(which may include tagged text data, indicators of intent, etc.) to a skill component(s) 690. If the NLU results data includes a single NLU hypothesis, the NLU component 660 may send the NLU results data to the skill component(s) 690 associated with the NLU hypothesis. If the NLU results data includes an N-best list of NLU hypotheses, the NLU component 660 may send the top scoring NLU hypothesis to a skill component(s) 690 associated with the top scoring NLU hypothesis. In some implementations, the NLU component 660 and/or skill component 690 may determine, using the interaction score, text data representing an indication of a handoff from one set of language processing components 692 to another (e.g., corresponding to a different virtual assistant profile).

A skill component 690 may be software running on or in conjunction with the system 600 that is, or is similar to, a software application. A skill component 690 may enable the system 600 to execute specific functionality in order to provide data or produce some other requested output. The system 600 may be configured with more than one skill component 690. For example, a weather service skill component may enable the system 600 to provide weather information, a car service skill component may enable the system 600 to book a trip with respect to a taxi or ride sharing service, a restaurant skill component may enable the system 600 to order a pizza with respect to the restaurant's online ordering system, etc. A skill component 690 may operate in conjunction between the system(s) 620 and other devices, such as the user device 610, in order to complete certain functions. Inputs to a skill component 690 may come from speech processing interactions or through other interactions or input sources. A skill component 690 may include hardware, software, firmware, or the like that may be dedicated to a particular skill component 690 or shared among different skill components 690.

Skill support system(s) 625 may communicate with a skill component(s) 690 within the system(s) 620 directly and/or via the orchestrator component 630. A skill support system(s) 625 may be configured to perform one or more actions. A skill may enable a skill support system(s) 625 to execute specific functionality in order to provide data or perform some other action requested by a user. For example, a weather service skill may enable a skill support system(s) 625 to provide weather information to the system(s) 620, a car service skill may enable a skill support system(s) 625 to book a trip with respect to a taxi or ride sharing service, an order pizza skill may enable a skill support system(s) 625 to order a pizza with respect to a restaurant's online ordering system, an AED skill component 690b may re-configure AED components, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system 600 may include a skill component 690 dedicated to interacting with the skill support system(s) 625. A skill, skill device, or skill component may include a skill component 690 operated by the system 600 and/or skill operated by the skill support system(s) 625.

The system 600 may include language output components 693 including a natural language generation component 679 and/or a TTS system 580, which was introduced in FIG. 5. The TTS system 580 may generate audio data (e.g., synthesized speech) from text data using one or more different methods. Text data input to the TTS system 580 may come from a skill component 690 (e.g., a book, news, or navigation skill), the orchestrator component 630, and/or another component of the system. The text data may include an indication of a speech-processing component and/or data responsive to a command. The TTS system 580 may retrieve a TTS model 480 from the voice profile storage 535 for generating synthesized speech having a specified speaker identity and/or voice characteristics. The TTS system 580 may output speech data (e.g., in the form of spectrograms) to the vocoder 590 for conversion to an audio signal suitable for output by the loudspeaker 614.

The system 600 may include profile storage 670. The profile storage 670 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage 670 may include one or more user profiles, with each user profile being associated with a different user identifier. Each user profile may include various user identifying information. Each user profile may also include preferences of the user and/or one or more device identifiers, representing one or more devices of the user. When a user logs into to, for example, an application installed on the device 610, the user profile (associated with the presented login information) may be updated to include information about the device 610. As described, the profile storage 670 may further include data that shows an interaction history of a user, including commands and times of receipt of commands. The profile storage 670 may further include data that shows when a second user was present to hear an indication of a handoff for a command uttered by a first user.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 600 may include a voice profile storage 535. The voice profile storage 535 may include a variety of information related to one or more target voices reproducible by the TTS system 580. A "voice profile" may refer to a set of data associated with a target voice, either representing a particular human speaker or wholly synthetic. The voice profile data may include speaker embedding data (e.g., representing a speaker identity), frequency data (e.g., pitch and/or timbre), and/or parameters of a TTS model 480 corresponding to a particular voice and/or voice style. In some implementations, the voice profile data may include additional information about a target voice and/or target speaker such as data regarding prosody, accent, voice energy, speaking style, and/or speaker type (e.g., sex, age, etc.). A voice profile may include a voice identifier that a user and/or component of the system 600 may use to access a particular target voice for reproduction. Thus, a skill component 690 may receive an instruction to generate a message in a certain individual's voice, and use the voice identifier to request TTS conversion of text data in the specified target voice. Upon receiving text for conversion into speech, the TTS system 580 may retrieve the identified voice profile from the voice profile storage 535, and use the retrieved voice characteristic data, TTS model 480 parameter data, etc., to generate synthetic speech that reproduces characteristics of the target voice.

Figure 11:
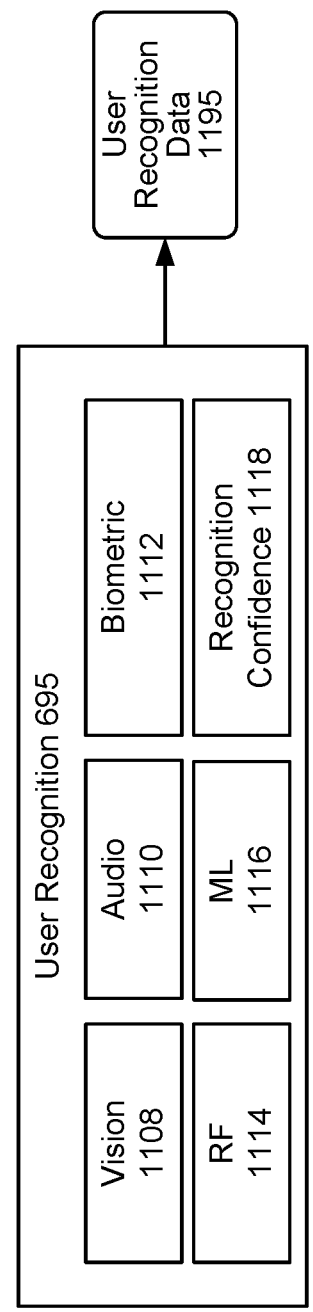
FIG. 11 is a schematic diagram of an illustrative architecture in which sensor data is combined to recognize one or more users according to embodiments of the present disclosure.

The system 600 may include a user recognition component 695 that recognizes one or more users using a variety of data, as described in greater detail below with regard to FIGS. 11-12. The user recognition component 695 may take as input the audio data 631 and/or text data output by the ASR component 650. The user recognition component 695 may perform user recognition by comparing audio characteristics in the audio data 631 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform NLU processing as well as processing performed by other components of the system.

The system 600 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 7:
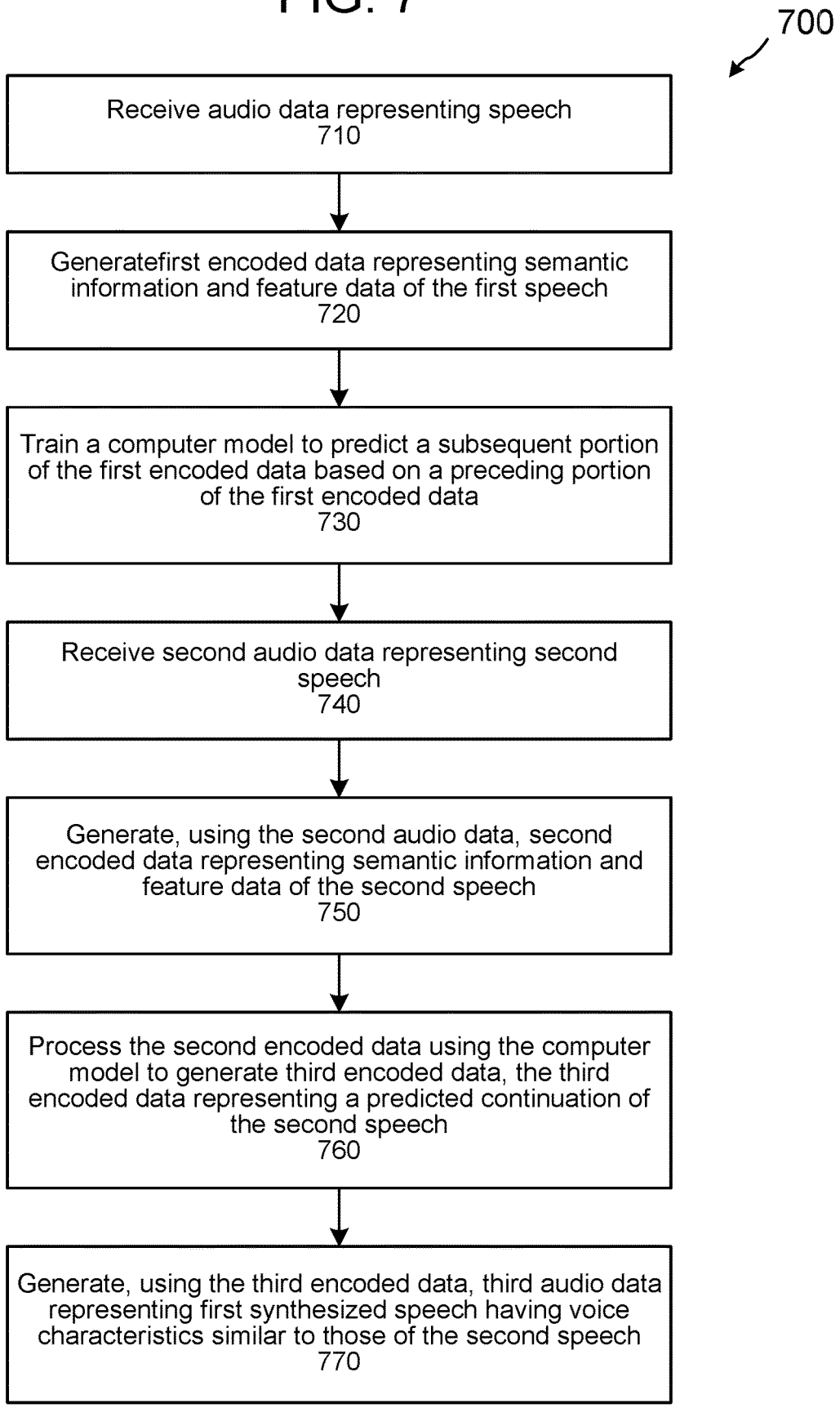
FIG. 7 is a flowchart illustrating an example method of augmenting a target voice dataset, according to embodiments of the present disclosure.

FIG. 7 is a flowchart illustrating an example method 700 of augmenting a target voice dataset, according to embodiments of the present disclosure. The method 700 may be performed using, for example, components of the system 100 and/or system 600. The method 700 may be used to generate a training dataset of a size suitable for training a TTS model to reproduce a target voice (e.g., a particular user, character, celebrity, etc.) based on a limited target voice dataset. For example, the method 700 may be used to generate several hours of sample speech based on only a few minutes of target voice speech samples. The generated sample speech may have voice characteristics similar to the target voice. The larger training dataset may improve the performance of a TTS model relative to one trained using only the limited target voice dataset.

The method 700 may include receiving first audio data representing first speech (stage 710). The audio data may be prerecorded or received by a microphone of the device. An acoustic front end of the device may digitize the audio data and convert it into a frequency content format such as Mel-spectrograms.

The method 700 may include generating first encoded data representing semantic information and feature data of the first speech (stage 720). A neural network encoder, such as the speech unit encoder 130, may process the first audio data to generate encoded speech unit data. The encoded speech unit data may include one or more arrays, vector, matrices, or other data structures that represent an encoding of semantic information and acoustic information (e.g., feature data) of the audio data. The encoder may be trained in conjunction with a neural network decoder, such as the speech unit decoder 150, using techniques described with reference to FIG. 2. The encoder and decoder may be trained to encode and decode semantic information (e.g., representing phonemes and/or words) and features of the audio data (e.g., relevant to determining and/or reproducing features such as prosody, timbre, speaker identity, speaking style, emotion, etc.).

The method 700 may include training a computer model to predict a subsequent portion of the first encoded data based on a preceding portion of the first encoded data (stage 730). The encoded speech unit data generated during the stage 720 may be used to train a computer model to predict encoded speech units based on previously received encoded speech units. The computer model may be the ASLM 140, which may be trained according to the techniques described with reference to FIG. 3. For example, partial sequences of encoded speech units may be input to the computer model, which can be trained to correctly predict masked encoded speech units. The predicted encoded speech units may represent speech that is consistent both semantically and acoustically with the preceding speech, in that the predicted speech may represent natural language reasonably likely to follow the preceding speech, and have voice characteristics similar to the preceding speech.

The method 700 may include receiving second audio data representing second speech (stage 740) and generating second encoded data representing semantic information and feature data of the second speech (stage 750). The second audio data may be from a target voice dataset to be augmented to create a larger dataset for training a TTS model. An encoder may process the second audio data in a manner similar to that of the stage 720. The method 700 may include processing the second encoded data using the computer model to generate third encoded data (stage 760). The computer model may process a sequence of one or more encoded speech data units to predict one or more subsequent encoded speech data units. The predicted encoded data may represent a predicted continuation of the second speech. In some implementations, the computer model may make multiple predictions using the second encoded data. In some implementations, the computer model may make additional predictions based on the predicted encoded data, etc.

The method 700 may include generating third audio data representing first synthesized speech having voice characteristics similar to those of the second speech (stage 770). The decoder may process the third encoded data to generate audio data. The audio data may be used to, for example, augment the target voice dataset. The augmented voice dataset may be used to train a TTS model, such as a TTS model 480, as described with reference to FIG. 4. A device such as the device 610 and/or a system such as the system 620 may use the trained TTS model to reproduce the target voice when, for example, narrating a book, delivering news, outputting a message, etc.

Figure 8:
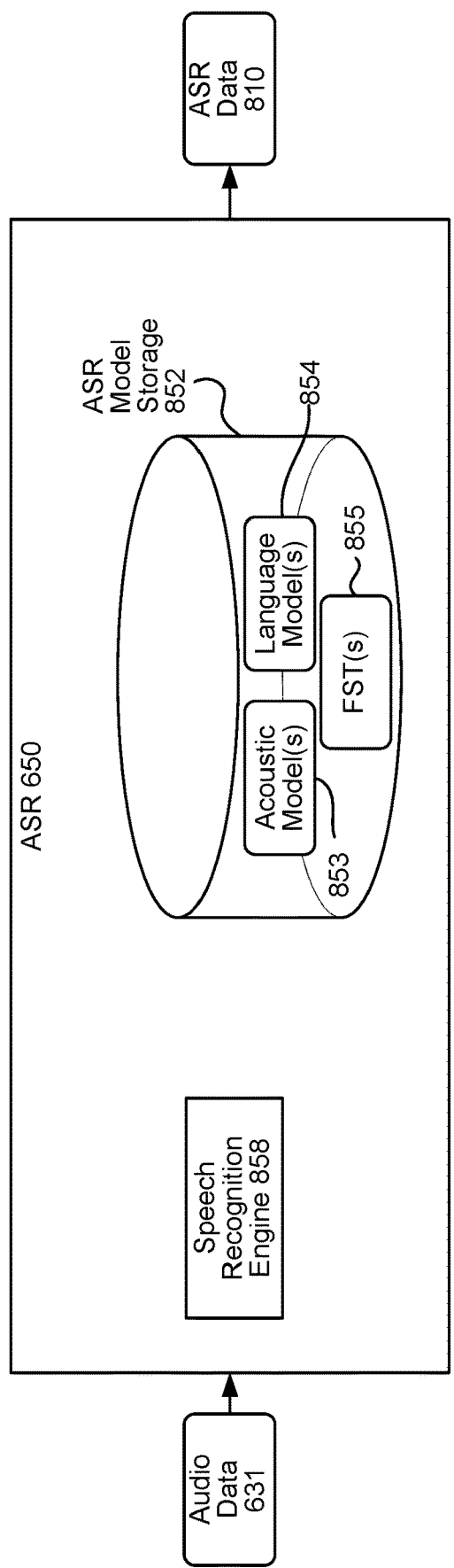
FIG. 8 is a conceptual diagram of an ASR component, according to embodiments of the present disclosure.

FIG. 8 is a conceptual diagram of an ASR component 650, according to embodiments of the present disclosure. The ASR component 650 may interpret a spoken natural language input based on the similarity between the spoken natural language input and pre-established language models 854 stored in an ASR model storage 852. For example, the ASR component 650 may compare the audio data with models for sounds (e.g., subword units or phonemes) and sequences of sounds to identify words that match the sequence of sounds spoken in the natural language input. Alternatively, the ASR component 650 may use a finite state transducer (FST) 855 to implement the language model functions. In some cases, the ASR component 650 may generate transcripts of recorded speech in one or more of the target speech dataset 115, the speech dataset 215, and/or the training dataset 315 in the event that the dataset does not include a transcript and/or was not generated based on the speaker(s) reading from a provided transcript.

When the ASR component 650 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). Based on the considered factors and the assigned confidence score, the ASR component 650 may output an ASR hypothesis that most likely matches the spoken natural language input, or may output multiple ASR hypotheses in the form of a lattice or an N-best list, with each ASR hypothesis corresponding to a respective score.

The ASR component 650 may include a speech recognition engine 858. The ASR component 650 may receive audio data 631 (for example, as received by a microphone 612 and/or processed by an AFE 624). The speech recognition engine 858 compares the audio data 631 with acoustic models 853, language models 854, FST(s) 855, and/or other data models and information for recognizing the speech conveyed in the audio data. The audio data 631 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as Mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the audio data 631 with reference to information stored in the ASR model storage 852. Feature vectors of the audio data 631 may arrive at the system 620 encoded, in which case they may be decoded prior to processing by the speech recognition engine 858.

The speech recognition engine 858 attempts to match received feature vectors to language acoustic units (e.g., phonemes) and words as known in the stored acoustic models 853, language models 6B54, and FST(s) 855. For example, audio data 631 may be processed by one or more acoustic model(s) 853 to determine acoustic unit data. The acoustic unit data may include indicators of acoustic units detected in the audio data 631 by the ASR component 650. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 854 (and/or using FST 855) to determine ASR output data 810. The ASR output data 810 can include one or more hypotheses. One or more of the hypotheses represented in the ASR output data 810 may then be sent to further components (such as the NLU component 660) for further processing as discussed herein. The ASR output data 810 may include representations of text of an utterance, such as words, subword units, or the like.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 650 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 650 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 650 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

FIGS. 9 and 10 illustrates how the NLU component 660 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 660 may process text data including several ASR hypotheses of a single user input. For example, if the ASR component 650 outputs text data including an n-best list of ASR hypotheses, the NLU component 660 may process the text data with respect to all (or a portion of) the ASR hypotheses represented therein.

The NLU component 660 may annotate text data by parsing and/or tagging the text data. For example, for the text data "tell me the weather for Seattle," the NLU component 660 may tag "tell me the weather for Seattle" as an <OutputWeather> intent as well as separately tag "Seattle" as a location for the weather information.

The NLU component 660 may include a shortlister component 950. The shortlister component 950 selects skills that may execute with respect to ASR output data 810 input to the NLU component 660 (e.g., applications that may execute with respect to the user input). The ASR output data 810 may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 660 may process ASR output data 810 input thereto with respect to every skill of the system, either in parallel, in series, or using some combination thereof. By implementing a shortlister component 950, the NLU component 660 may process ASR output data 810 with respect to only the skills that may execute with respect to the user input. This reduces total compute power and latency attributed to NLU processing.

The shortlister component 950 may include one or more trained models. The model(s) may be trained to recognize various forms of user inputs that may be received by the system(s) 620. For example, during a training period skill system(s) 625 associated with a skill may provide the system(s) 620 with training text data representing sample user inputs that may be provided by a user to invoke the skill. For example, for a ride sharing skill, a skill system(s) 625 associated with the ride sharing skill may provide the system(s) 620 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the system(s) 620 may solicit the skill system(s) 625 associated with the skill regarding whether the determined other user input structures are permissible, from the perspective of the skill system(s) 625, to be used to invoke the skill. The alternate user input structures may be derived by one or more trained models during model training and/or may be based on user input structures provided by different skills. The skill system(s) 625 associated with a particular skill may also provide the system(s) 620 with training text data indicating grammar and annotations. The system(s) 620 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The system(s) 620 may use the sample user inputs provided by a skill system(s) 625, and related sample user inputs potentially determined during training, as binary examples to train a model associated with a skill associated with the skill system(s) 625. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 810 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 660 may include one or more recognizers 963. In at least some embodiments, a recognizer 963 may be associated with a skill support system 625 (e.g., the recognizer may be configured to interpret text data to correspond to the skill support system 625). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 810 is potentially associated with multiple domains, the recognizers 963 associated with the domains may process the ASR output data 810, while recognizers 963 not indicated in the shortlister component 950's output may not process the ASR output data 810. The "shortlisted" recognizers 963 may process the ASR output data 810 in parallel, in series, partially in parallel, etc. For example, if ASR output data 810 potentially relates to both a communications domain and a music domain, a recognizer associated with the communications domain may process the ASR output data 810 in parallel, or partially in parallel, with a recognizer associated with the music domain processing the ASR output data 810.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 660) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or device 610. For example, a Gazetteer A (984*a*) includes skill-indexed lexical information 986*aa* to 986*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data) that may be useful for later processing. The NER component 962 may also label each slot with a type (e.g., noun, place, city, artist name, song name, etc.).

Each grammar database 976 includes the names of entities (i.e., nouns) commonly found in speech about the particular domain to which the grammar database 976 relates, whereas the lexical information 986 is personalized to the user and/or the device 610 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 660 may utilize gazetteer information (984a-984n) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent}<PlayMusic>, {artist name} rolling stones, {media type} SONG, and {song title} mother's little helper. For further example, the NER component 962 may tag "play songs by the rolling stones" as: {domain} Music, {intent}<PlayMusic>, {artist name} rolling stones, and {media type} SONG.

The shortlister component 950 may receive ASR output data 810 output from the ASR component 650 or output from the device 610b (as illustrated in FIG. 10). The ASR component 650 may embed the ASR output data 810 into a form processable by a trained model(s) using sentence embedding techniques as known in the art. Sentence embedding results in the ASR output data 810 including text in a structure that enables the trained models of the shortlister component 950 to operate on the ASR output data 810. For example, an embedding of the ASR output data 810 may be a vector representation of the ASR output data 810.

The shortlister component 950 may make binary determinations (e.g., yes or no) regarding which domains relate to the ASR output data 810. The shortlister component 950 may make such determinations using the one or more trained models described herein above. If the shortlister component 950 implements a single trained model for each domain, the shortlister component 950 may simply run the models that are associated with enabled domains as indicated in a user profile associated with the device 610 and/or user that originated the user input.

The shortlister component 950 may generate n-best list data 1015 representing domains that may execute with respect to the user input represented in the ASR output data 810. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 810. In another example, instead of indicating every domain of the system, the n-best list data 1015 may only indicate the domains that are likely to be able to execute the user input represented in the ASR output data 810. In yet another example, the shortlister component 950 may implement thresholding such that the n-best list data 1015 may indicate no more than a maximum number of domains that may execute the user input represented in the ASR output data 810. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 810 by the shortlister component 950 relative to such domains) are included in the n-best list data 1015.

The ASR output data 810 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 810.

As indicated above, the shortlister component 950 may implement thresholding such that an n-best list output therefrom may include no more than a threshold number of entries. If the ASR output data 810 includes more than one ASR hypothesis, the n-best list output by the shortlister component 950 may include no more than a threshold number of entries irrespective of the number of ASR hypotheses output by the ASR component 650. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 810, the shortlister component 950 may generate confidence scores representing likelihoods that domains relate to the ASR output data 810. If the shortlister component 950 implements a different trained model for each domain, the shortlister component 950 may generate a different confidence score for each individual domain trained model that is run. If the shortlister component 950 runs the models of every domain when ASR output data 810 is received, the shortlister component 950 may generate a different confidence score for each domain of the system. If the shortlister component 950 runs the models of only the domains that are associated with skills indicated as enabled in a user profile associated with the device 610 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 810.

N-best list data 1015 including confidence scores that may be output by the shortlister component 950 may be represented as, for example:

Search domain, 0.67
Recipe domain, 0.62
Information domain, 0.57
Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 810 as well as respective confidence scores. The other data 1020 may include usage history data associated with the device 610 and/or user that originated the user input. For example, a confidence score of a domain may be increased if user inputs originated by the device 610 and/or user routinely invoke the domain. Conversely, a confidence score of a domain may be decreased if user inputs originated by the device 610 and/or user rarely invoke the domain. Thus, the other data 1020 may include an indicator of the user associated with the ASR output data 810, for example as determined by the user recognition component 695.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the device 610 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 670. When the shortlister component 950 receives the ASR output data 810, the shortlister component 950 may determine whether profile data associated with the user and/or device 610 that originated the command includes an indication of enabled skills.

The other data 1020 may also include data indicating the type of the device 610. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the device 610 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the device 610 that originated the user input corresponding to the ASR output data 810. For example, if the device 610 is a displayless device, the shortlister component 950 may increase the confidence score associated with the domain that generates audio data while leaving the confidence score associated with the domain that generates video data the same. Alternatively, if the device 610 is a displayless device, the shortlister component 950 may leave the confidence score associated with the domain that generates audio data the same while decreasing the confidence score associated with the domain that generates video data. Moreover, if the device 610 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the system(s) 620 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list 1015 unless the shortlister component 950 is one hundred percent confident that the domain may not execute the user input represented in the ASR output data 810 (e.g., the shortlister component 950 determines a confidence score of zero for the domain).

The shortlister component 950 may send the ASR output data 810 to recognizers 963 associated with domains represented in the n-best list data 1015. Alternatively, the shortlister component 950 may send the n-best list data 1015 or some other indicator of the selected subset of domains to another component (such as the orchestrator component 630) which may in turn send the ASR output data 810 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 630 may send the ASR output data 810 to recognizers 963 associated with domains that the shortlister component 950 determines may execute the user input. If the shortlister component 950 generates an n-best list representing domains with associated confidence scores, the shortlister component 950/orchestrator component 630 may send the ASR output data 810 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 660 may compile the output tagged text data of the recognizers 963 into a single cross-domain n-best list 1040 and may send the cross-domain n-best list 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 660 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972. The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list 1060 but that includes more detailed information (e.g., entity IDs) about the specific entities mentioned in the slots and/or more detailed slot data that can eventually be used by a skill. The NLU component 660 may include multiple entity resolution components 1070 and each entity resolution component 1070 may be specific to one or more domains.

The NLU component 660 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of device 610, user identifier, context, as well as other information. For example, the reranker 1090 may consider when any particular skill is currently active (e.g., music being played, a game being played, etc.).

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 660 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 660 may perform NLU processing described above with respect to domains associated with skills wholly implemented as part of the system(s) 620 (e.g., designated 690 in FIG. 6). The NLU component 660 may separately perform NLU processing described above with respect to domains associated with skills that are at least partially implemented as part of the skill system(s) 625. In an example, the shortlister component 950 may only process with respect to these latter domains. Results of these two NLU processing paths may be merged into NLU results data 1085, which may be sent to a post-NLU ranker 665, which may be implemented by the system(s) 620.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU results data 1085, skill result data 1030, and the other data 1020 in order to output ranked output data 1025. The ranked output data 1025 may include an n-best list where the NLU hypotheses in the NLU results data 1085 are reordered such that the n-best list in the ranked output data 1025 represents a prioritized list of skills to respond to a user input as determined by the post-NLU ranker 665. The ranked output data 1025 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU results data 1085 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 630) may solicit the first skill and the second skill to provide potential result data 1030 based on the first NLU hypothesis and the second NLU hypothesis, respectively. For example, the post-NLU ranker 665 may send the first NLU hypothesis to the first skill 690a along with a request for the first skill 690a to at least partially execute with respect to the first NLU hypothesis. The post-NLU ranker 665 may also send the second NLU hypothesis to the second skill 690b along with a request for the second skill 690b to at least partially execute with respect to the second NLU hypothesis. The post-NLU ranker 665 receives, from the first skill 690a, first result data 1030a generated from the first skill 690a's execution with respect to the first NLU hypothesis. The post-NLU ranker 665 also receives, from the second skill 690b, second results data 1030b generated from the second skill 690b's execution with respect to the second NLU hypothesis.

The result data 1030 may include various portions. For example, the result data 1030 may include content (e.g., audio data, text data, and/or video data) to be output to a user. The result data 1030 may also include a unique identifier used by the system(s) 620 and/or the skill system(s) 625 to locate the data to be output to a user. The result data 1030 may also include an instruction. For example, if the user input corresponds to "turn on the light," the result data 1030 may include an instruction causing the system to turn on a light associated with a profile of the device (610a/610b) and/or user.

The post-NLU ranker 665 may consider the first result data 1030a and the second result data 1030b to alter the first confidence score and the second confidence score of the first NLU hypothesis and the second NLU hypothesis, respectively. That is, the post-NLU ranker 665 may generate a third confidence score based on the first result data 1030a and the first confidence score. The third confidence score may correspond to how likely the post-NLU ranker 665 determines the first skill will correctly respond to the user input. The post-NLU ranker 665 may also generate a fourth confidence score based on the second result data 1030b and the second confidence score. One skilled in the art will appreciate that a first difference between the third confidence score and the fourth confidence score may be greater than a second difference between the first confidence score and the second confidence score. The post-NLU ranker 665 may also consider the other data 1020 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 1030 associated with the skill 690 with the highest altered confidence score to be the data output in response to the current user input. The post-NLU ranker 665 may also consider the ASR output data 810 to alter the NLU hypotheses confidence scores.

The orchestrator component 630 may, prior to sending the NLU results data 1085 to the post-NLU ranker 665, associate intents in the NLU hypotheses with skills 690. For example, if a NLU hypothesis includes a <PlayMusic> intent, the orchestrator component 630 may associate the NLU hypothesis with one or more skills 690 that can execute the <PlayMusic> intent. Thus, the orchestrator component 630 may send the NLU results data 1085, including NLU hypotheses paired with skills 690, to the post-NLU ranker 665. In response to ASR output data 810 corresponding to "what should I do for dinner today," the orchestrator component 630 may generates pairs of skills 690 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 665 queries each skill 690, paired with a NLU hypothesis in the NLU results data 1085, to provide result data 1030 based on the NLU hypothesis with which it is associated. That is, with respect to each skill, the post-NLU ranker 665 colloquially asks the each skill "if given this NLU hypothesis, what would you do with it." According to the above example, the post-NLU ranker 665 may send skills 690 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 665 may query each of the skills 690 in parallel or substantially in parallel.

A skill 690 may provide the post-NLU ranker 665 with various data and indications in response to the post-NLU ranker 665 soliciting the skill 690 for result data 1030. A skill 690 may simply provide the post-NLU ranker 665 with an indication of whether or not the skill can execute with respect to the NLU hypothesis it received. A skill 690 may also or alternatively provide the post-NLU ranker 665 with output data generated based on the NLU hypothesis it received. In some situations, a skill 690 may need further information in addition to what is represented in the received NLU hypothesis to provide output data responsive to the user input. In these situations, the skill 690 may provide the post-NLU ranker 665 with result data 1030 indicating slots of a framework that the skill 690 further needs filled or entities that the skill 690 further needs resolved prior to the skill 690 being able to provided result data 1030 responsive to the user input. The skill 690 may also provide the post-NLU ranker 665 with an instruction and/or computer-generated speech indicating how the skill 690 recommends the system solicit further information needed by the skill 690. The skill 690 may further provide the post-NLU ranker 665 with an indication of whether the skill 690 will have all needed information after the user provides additional information a single time, or whether the skill 690 will need the user to provide various kinds of additional information prior to the skill 690 having all needed information. According to the above example, skills 690 may provide the post-NLU ranker 665 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1030 includes an indication provided by a skill 690 indicating whether or not the skill 690 can execute with respect to a NLU hypothesis; data generated by a skill 690 based on a NLU hypothesis; as well as an indication provided by a skill 690 indicating the skill 690 needs further information in addition to what is represented in the received NLU hypothesis.

The post-NLU ranker 665 uses the result data 1030 provided by the skills 690 to alter the NLU processing confidence scores generated by the reranker 1090. That is, the post-NLU ranker 665 uses the result data 1030 provided by the queried skills 690 to create larger differences between the NLU processing confidence scores generated by the reranker 1090. Without the post-NLU ranker 665, the system may not be confident enough to determine an output in response to a user input, for example when the NLU hypotheses associated with multiple skills are too close for the system to confidently determine a single skill 690 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 690 that provide result data 1030 responsive to NLU hypotheses over skills 690 that provide result data 1030 corresponding to an indication that further information is needed, as well as skills 690 that provide result data 1030 indicating they can provide multiple responses to received NLU hypotheses. For example, the post-NLU ranker 665 may generate a first score for a first skill 690*a* that is greater than the first skill's NLU confidence score based on the first skill 690*a* providing result data 1030*a* including a response to a NLU hypothesis. For further example, the post-NLU ranker 665 may generate a second score for a second skill 690*b* that is less than the second skill's NLU confidence score based on the second skill 690*b* providing result data 1030*b* indicating further information is needed for the second skill 690*b* to provide a response to a NLU hypothesis. Yet further, for example, the post-NLU ranker 665 may generate a third score for a third skill 690*c* that is less than the third skill's NLU confidence score based on the third skill 690*c* providing result data 1030*c* indicating the third skill 690*c* can provide multiple responses to a NLU hypothesis.

The post-NLU ranker 665 may consider other data 1020 in determining scores. The other data 1020 may include rankings associated with the queried skills 690. A ranking may be a system ranking or a user-specific ranking. A ranking may indicate a veracity of a skill from the perspective of one or more users of the system. For example, the post-NLU ranker 665 may generate a first score for a first skill 690*a* that is greater than the first skill's NLU processing confidence score based on the first skill 690*a* being associated with a high ranking. For further example, the post-NLU ranker 665 may generate a second score for a second skill 690*b* that is less than the second skill's NLU processing confidence score based on the second skill 690*b* being associated with a low ranking.

The other data 1020 may include information indicating whether or not the user that originated the user input has enabled one or more of the queried skills 690. For example, the post-NLU ranker 665 may generate a first score for a first skill 690*a* that is greater than the first skill's NLU processing confidence score based on the first skill 690*a* being enabled by the user that originated the user input. For further example, the post-NLU ranker 665 may generate a second score for a second skill 690*b* that is less than the second skill's NLU processing confidence score based on the second skill 690*b* not being enabled by the user that originated the user input. When the post-NLU ranker 665 receives the NLU results data 1085, the post-NLU ranker 665 may determine whether profile data, associated with the user and/or device that originated the user input, includes indications of enabled skills.

The other data 1020 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 1020 may include information indicating the veracity of the result data 1030 provided by a skill 690. For example, if a user says "tell me a recipe for pasta sauce," a first skill 690*a* may provide the post-NLU ranker 665 with first result data 1030*a* corresponding to a first recipe associated with a five star rating and a second skill 690*b* may provide the post-NLU ranker 665 with second result data 1030*b* corresponding to a second recipe associated with a one star rating. In this situation, the post-NLU ranker 665 may increase the NLU processing confidence score associated with the first skill 690*a* based on the first skill 690*a* providing the first result data 1030*a* associated with the five star rating and/or decrease the NLU processing confidence score associated with the second skill 690*b* based on the second skill 690*b* providing the second result data 1030*b* associated with the one star rating.

The other data 1020 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 690*a* corresponding to a room service skill associated with the hotel and/or decrease the NLU processing confidence score associated with a second skill 690*b* corresponding to a food skill not associated with the hotel.

The other data 1020 may include information indicating a location of the device and/or user that originated the user input. The system may be configured with skills 690 that may only operate with respect to certain geographic locations. For example, a user may provide a user input corresponding to "when is the next train to Portland." A first skill 690*a* may operate with respect to trains that arrive at, depart from, and pass through Portland, Oregon. A second skill 690*b* may operate with respect to trains that arrive at, depart from, and pass through Portland, Maine. If the device and/or user that originated the user input is located in Seattle, Washington, the post-NLU ranker 665 may increase the NLU processing confidence score associated with the first skill 690*a* and/or decrease the NLU processing confidence score associated with the second skill 690*b*. Likewise, if the device and/or user that originated the user input is located in Boston, Massachusetts, the post-NLU ranker 665 may increase the NLU processing confidence score associated with the second skill 690*b* and/or decrease the NLU processing confidence score associated with the first skill 690*a*.

The other data 1020 may include information indicating a time of day. The system may be configured with skills 690 that operate with respect to certain times of day. For example, a user may provide a user input corresponding to "order me food." A first skill 690*a* may generate first result data 1030*a* corresponding to breakfast. A second skill 690*b* may generate second result data 1030*b* corresponding to dinner. If the system(s) 620 receives the user input in the morning, the post-NLU ranker 665 may increase the NLU processing confidence score associated with the first skill 690*a* and/or decrease the NLU processing score associated with the second skill 690*b*. If the system(s) 620 receives the user input in the afternoon or evening, the post-NLU ranker 665 may increase the NLU processing confidence score associated with the second skill 690*b* and/or decrease the NLU processing confidence score associated with the first skill 690*a*.

The other data 1020 may include information indicating user preferences. The system may include multiple skills 690 configured to execute in substantially the same manner. For example, a first skill 690*a* and a second skill 690*b* may both be configured to order food from respective restaurants. The system may store a user preference (e.g., in the profile storage 670) that is associated with the user that provided the user input to the system(s) 620 as well as indicates the user prefers the first skill 690*a* over the second skill 690*b*. Thus, when the user provides a user input that may be executed by both the first skill 690*a* and the second skill 690*b*, the post-NLU ranker 665 may increase the NLU processing confidence score associated with the first skill 690*a* and/or decrease the NLU processing confidence score associated with the second skill 690*b*.

The other data 1020 may include information indicating system usage history associated with the user that originated the user input. For example, the system usage history may indicate the user originates user inputs that invoke a first skill 690*a* more often than the user originates user inputs that invoke a second skill 690*b*. Based on this, if the present user input may be executed by both the first skill 690*a* and the second skill 690*b*, the post-NLU ranker 665 may increase the NLU processing confidence score associated with the first skill 690*a* and/or decrease the NLU processing confidence score associated with the second skill 690*b*.

The other data 1020 may include information indicating a speed at which the device 610 that originated the user input is traveling. For example, the device 610 may be located in a moving vehicle, or may be a moving vehicle. When a device 610 is in motion, the system may prefer audio outputs rather than visual outputs to decrease the likelihood of distracting the user (e.g., a driver of a vehicle). Thus, for example, if the device 610 that originated the user input is moving at or above a threshold speed (e.g., a speed above an average user's walking speed), the post-NLU ranker 665 may increase the NLU processing confidence score associated with a first skill 690*a* that generates audio data. The post-NLU ranker 665 may also or alternatively decrease the NLU processing confidence score associated with a second skill 690*b* that generates image data or video data.

The other data 1020 may include information indicating how long it took a skill 690 to provide result data 1030 to the post-NLU ranker 665. When the post-NLU ranker 665 multiple skills 690 for result data 1030, the skills 690 may respond to the queries at different speeds. The post-NLU ranker 665 may implement a latency budget. For example, if the post-NLU ranker 665 determines a skill 690 responds to the post-NLU ranker 665 within a threshold amount of time from receiving a query from the post-NLU ranker 665, the post-NLU ranker 665 may increase the NLU processing confidence score associated with the skill 690. Conversely, if the post-NLU ranker 665 determines a skill 690 does not respond to the post-NLU ranker 665 within a threshold amount of time from receiving a query from the post-NLU ranker 665, the post-NLU ranker 665 may decrease the NLU processing confidence score associated with the skill 690.

It has been described that the post-NLU ranker 665 uses the other data 1020 to increase and decrease NLU processing confidence scores associated with various skills 690 that the post-NLU ranker 665 has already requested result data from. Alternatively, the post-NLU ranker 665 may use the other data 1020 to determine which skills 690 to request result data from. For example, the post-NLU ranker 665 may use the other data 1020 to increase and/or decrease NLU processing confidence scores associated with skills 690 associated with the NLU results data 1085 output by the NLU component 660. The post-NLU ranker 665 may select n-number of top scoring altered NLU processing confidence scores. The post-NLU ranker 665 may then request result data 1030 from only the skills 690 associated with the selected n-number of NLU processing confidence scores.

As described, the post-NLU ranker 665 may request result data 1030 from all skills 690 associated with the NLU results data 1085 output by the NLU component 660. Alternatively, the system(s) 620 may prefer result data 1030 from skills implemented entirely by the system(s) 620 rather than skills at least partially implemented by the skill system(s) 625. Therefore, in the first instance, the post-NLU ranker 665 may request result data 1030 from only skills associated with the NLU results data 1085 and entirely implemented by the system(s) 620. The post-NLU ranker 665 may only request result data 1030 from skills associated with the NLU results data 1085, and at least partially implemented by the skill system(s) 625, if none of the skills, wholly implemented by the system(s) 620, provide the post-NLU ranker 665 with result data 1030 indicating either data response to the NLU results data 1085, an indication that the skill can execute the user input, or an indication that further information is needed.

As indicated above, the post-NLU ranker 665 may request result data 1030 from multiple skills 690. If one of the skills 690 provides result data 1030 indicating a response to a NLU hypothesis and the other skills provide result data 1030 indicating either they cannot execute or they need further information, the post-NLU ranker 665 may select the result data 1030 including the response to the NLU hypothesis as the data to be output to the user. If more than one of the skills 690 provides result data 1030 indicating responses to NLU hypotheses, the post-NLU ranker 665 may consider the other data 1020 to generate altered NLU processing confidence scores, and select the result data 1030 of the skill associated with the greatest score as the data to be output to the user.

A system that does not implement the post-NLU ranker 665 may select the highest scored NLU hypothesis in the NLU results data 1085. The system may send the NLU hypothesis to a skill 690 associated therewith along with a request for output data. In some situations, the skill 690 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU results data 1085 to provide result data 1030 to the post-NLU ranker 665 prior to the post-NLU ranker 665 ultimately determining the skill 690 to be invoked to respond to the user input. Some of the skills 690 may provide result data 1030 indicating responses to NLU hypotheses while other skills 690 may providing result data 1030 indicating the skills cannot provide responsive data. Whereas a system not implementing the post-NLU ranker 665 may select one of the skills 690 that could not provide a response, the post-NLU ranker 665 only selects a skill 690 that provides the post-NLU ranker 665 with result data corresponding to a response, indicating further information is needed, or indicating multiple responses can be generated.

The post-NLU ranker 665 may select result data 1030, associated with the skill 690 associated with the highest score, for output to the user. Alternatively, the post-NLU ranker 665 may output ranked output data 1025 indicating skills 690 and their respective post-NLU ranker rankings. Since the post-NLU ranker 665 receives result data 1030, potentially corresponding to a response to the user input, from the skills 690 prior to post-NLU ranker 665 selecting one of the skills or outputting the ranked output data 1025, little to no latency occurs from the time skills provide result data 1030 and the time the system outputs responds to the user.

If the post-NLU ranker 665 selects result audio data to be output to a user and the system determines content should be output audibly, the post-NLU ranker 665 (or another component of the system(s) 620) may cause the device 610*a* and/or the device 610*b* to output audio corresponding to the result audio data. If the post-NLU ranker 665 selects result text data to output to a user and the system determines content should be output visually, the post-NLU ranker 665 (or another component of the system(s) 620) may cause the device 610*b* to display text corresponding to the result text data. If the post-NLU ranker 665 selects result audio data to output to a user and the system determines content should be output visually, the post-NLU ranker 665 (or another component of the system(s) 620) may send the result audio data to the ASR component 650. The ASR component 650 may generate output text data corresponding to the result audio data. The system(s) 620 may then cause the device 610*b* to display text corresponding to the output text data. If the post-NLU ranker 665 selects result text data to output to a user and the system determines content should be output audibly, the post-NLU ranker 665 (or another component of the system(s) 620) may send the result text data to the TTS system 580. The TTS system 580 may generate output audio data (corresponding to computer-generated speech) based on the result text data. The system(s) 620 may then cause the device 610*a* and/or the device 610*b* to output audio corresponding to the output audio data.

As described, a skill 690 may provide result data 1030 either indicating a response to the user input, indicating more information is needed for the skill 690 to provide a response to the user input, or indicating the skill 690 cannot provide a response to the user input. If the skill 690 associated with the highest post-NLU ranker score provides the post-NLU ranker 665 with result data 1030 indicating a response to the user input, the post-NLU ranker 665 (or another component of the system(s) 620, such as the orchestrator component 630) may simply cause content corresponding to the result data 1030 to be output to the user. For example, the post-NLU ranker 665 may send the result data 1030 to the orchestrator component 630. The orchestrator component 630 may cause the result data 1030 to be sent to the device (610*a*/610*b*), which may output audio and/or display text corresponding to the result data 1030. The orchestrator component 630 may send the result data 1030 to the ASR component 650 to generate output text data and/or may send the result data 1030 to the TTS system 580 to generate output audio data, depending on the situation.

The skill 690 associated with the highest post-NLU ranker score may provide the post-NLU ranker 665 with result data 1030 indicating more information is needed as well as instruction data. The instruction data may indicate how the skill 690 recommends the system obtain the needed information. For example, the instruction data may correspond to text data or audio data (i.e., computer-generated speech) corresponding to "please indicate_____." The instruction data may be in a format (e.g., text data or audio data) capable of being output by the device (610*a*/610*b*). When this occurs, the post-NLU ranker 665 may simply cause the received instruction data be output by the device (610*a*/610*b*). Alternatively, the instruction data may be in a format that is not capable of being output by the device (610*a*/610*b*). When this occurs, the post-NLU ranker 665 may cause the ASR component 650 or the TTS system 580 to process the instruction data, depending on the situation, to generate instruction data that may be output by the device (610*a*/610*b*). Once the user provides the system with all further information needed by the skill 690, the skill 690 may provide the system with result data 1030 indicating a response to the user input, which may be output by the system as detailed above.

The system may include "informational" skills 690 that simply provide the system with information, which the system outputs to the user. The system may also include "transactional" skills 690 that require a system instruction to execute the user input. Transactional skills 690 include ride sharing skills, flight booking skills, etc. A transactional skill 690 may simply provide the post-NLU ranker 665 with result data 1030 indicating the transactional skill 690 can execute the user input. The post-NLU ranker 665 may then cause the system to solicit the user for an indication that the system is permitted to cause the transactional skill 690 to execute the user input. The user-provided indication may be an audible indication or a tactile indication (e.g., activation of a virtual button or input of text via a virtual keyboard). In response to receiving the user-provided indication, the system may provide the transactional skill 690 with data corresponding to the indication. In response, the transactional skill 690 may execute the command (e.g., book a flight, book a train ticket, etc.). Thus, while the system may not further engage an informational skill 690 after the informational skill 690 provides the post-NLU ranker 665 with result data 1030, the system may further engage a transactional skill 690 after the transactional skill 690 provides the post-NLU ranker 665 with result data 1030 indicating the transactional skill 690 may execute the user input.

In some instances, the post-NLU ranker 665 may generate respective scores for first and second skills that are too close (e.g., are not different by at least a threshold difference) for the post-NLU ranker 665 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 630, post-NLU ranker 665, shortlister 950, or other component may be trained and operated according to various machine learning techniques.

The device 610 and/or the system(s) 620 may include a user recognition component 695 that recognizes one or more users using a variety of data. As illustrated in FIG. 11, the user recognition component 695 may include one or more subcomponents including a vision component 1108, an audio component 1110, a biometric component 1112, a radio frequency (RF) component 1114, a machine learning (ML) component 1116, and a recognition confidence component 1118. In some instances, the user recognition component 695 may monitor data and determinations from one or more subcomponents to determine an identity of one or more users associated with data input to the device 610 and/or the system(s) 620. The user recognition component 695 may output user recognition data 1195, which may include a user identifier associated with a user the user recognition component 695 determines originated data input to the device 610 and/or the system(s) 620. The user recognition data 1195 may be used to inform processes performed by various components of the device 610 and/or the system(s) 620.

The vision component 1108 may receive data from one or more sensors capable of providing images (e.g., cameras) or sensors indicating motion (e.g., motion sensors). The vision component 1108 can perform facial recognition or image analysis to determine an identity of a user and to associate that identity with a user profile associated with the user. In some instances, when a user is facing a camera, the vision component 1108 may perform facial recognition and identify the user with a high degree of confidence. In other instances, the vision component 1108 may have a low degree of confidence of an identity of a user, and the user recognition component 695 may utilize determinations from additional components to determine an identity of a user. The vision component 1108 can be used in conjunction with other components to determine an identity of a user. For example, the user recognition component 695 may use data from the vision component 1108 with data from the audio component 1110 to identify what user's face appears to be speaking at the same time audio is captured by a device 610 the user is facing for purposes of identifying a user who spoke an input to the device 610 and/or the system(s) 620.

The overall system of the present disclosure may include biometric sensors that transmit data to the biometric component 1112. For example, the biometric component 1112 may receive data corresponding to fingerprints, iris or retina scans, thermal scans, weights of users, a size of a user, pressure (e.g., within floor sensors), etc., and may determine a biometric profile corresponding to a user. The biometric component 1112 may distinguish between a user and sound from a television, for example. Thus, the biometric component 1112 may incorporate biometric information into a confidence level for determining an identity of a user. Biometric information output by the biometric component 1112 can be associated with specific user profile data such that the biometric information uniquely identifies a user profile of a user.

The radio frequency (RF) component 1114 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1114 the strength of the signal (e.g., as a received signal strength indication (RSSI)). The RF component 1114 may use the RSSI to determine an identity of a user (with an associated confidence level). In some instances, the RF component 1114 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 610. In this manner, the user may "register" with the system 600 for purposes of the system 600 determining who spoke a particular input. Such a registration may occur prior to, during, or after speaking of an input.

The ML component 1116 may track the behavior of various users as a factor in determining a confidence level of the identity of the user. By way of example, a user may adhere to a regular schedule such that the user is at a first location during the day (e.g., at work or at school). In this example, the ML component 1116 would factor in past behavior and/or trends in determining the identity of the user that provided input to the device 610 and/or the system(s) 620. Thus, the ML component 1116 may use historical data and/or usage patterns over time to increase or decrease a confidence level of an identity of a user.

In at least some instances, the recognition confidence component 1118 receives determinations from the various components 1108, 1110, 1112, 1114, and 1116, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1195.

The audio component 1110 may receive data from one or more sensors capable of providing an audio signal (e.g., one or more microphones 612) to facilitate recognition of a user. The audio component 1110 may perform audio recognition on an audio signal to determine an identity of the user and associated user identifier. In some instances, aspects of device 610 and/or the system(s) 620 may be configured at a computing device (e.g., a local server). Thus, in some instances, the audio component 1110 operating on a computing device may analyze all sound to facilitate recognition of a user. In some instances, the audio component 1110 may perform voice recognition to determine an identity of a user.

The audio component 1110 may also perform user identification based on audio data 631 input into the device 610 and/or the system(s) 620 for speech processing. The audio component 1110 may determine scores indicating whether speech in the audio data 631 originated from particular users. For example, a first score may indicate a likelihood that speech in the audio data 631 originated from a first user associated with a first user identifier, a second score may indicate a likelihood that speech in the audio data 631 originated from a second user associated with a second user identifier, etc. The audio component 1110 may perform user recognition by comparing speech characteristics represented in the audio data 631 to stored speech characteristics of users (e.g., stored voice profiles associated with the device 610 that captured the spoken user input).

Figure 12:
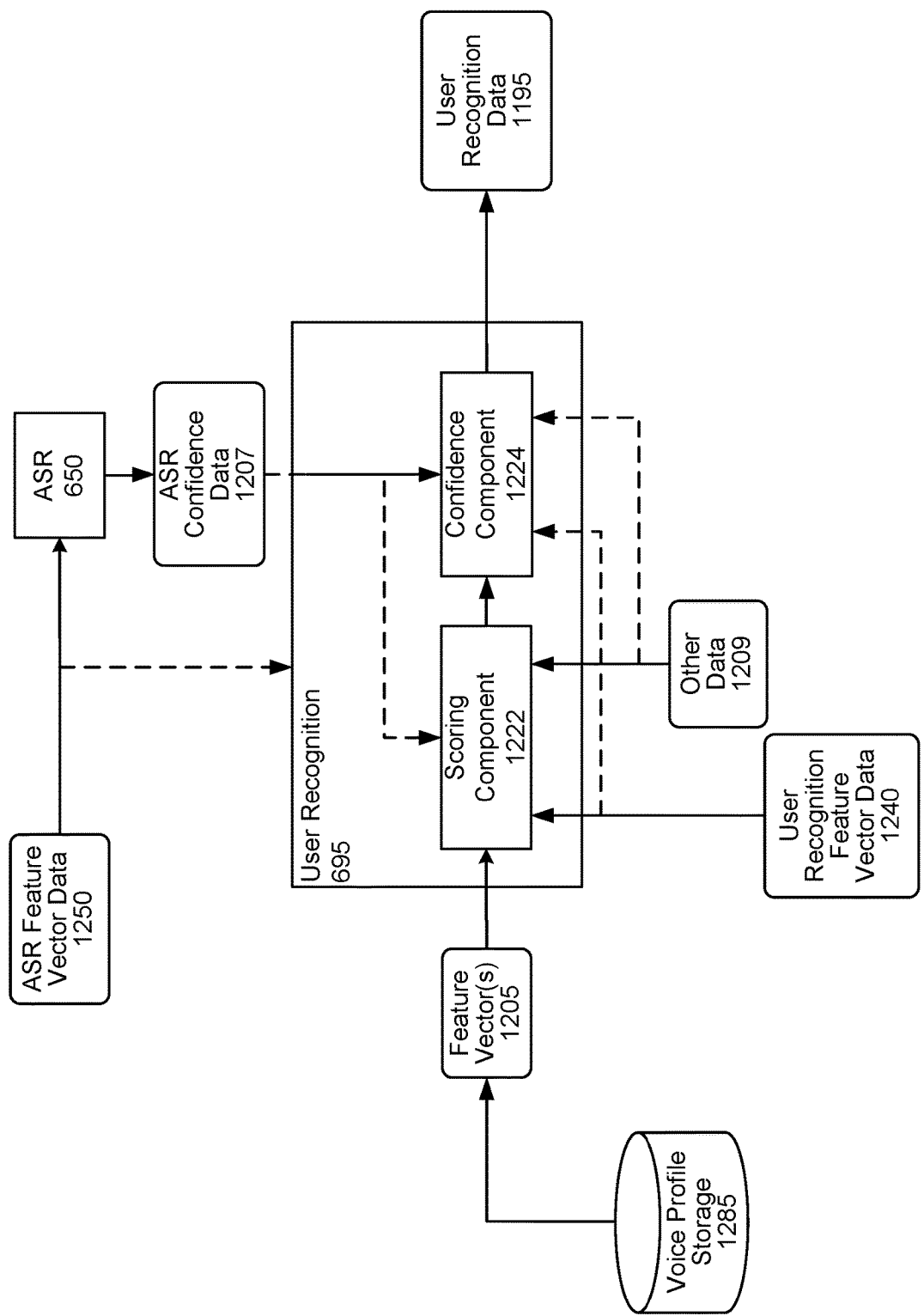
FIG. 12 is a system flow diagram illustrating user recognition according to embodiments of the present disclosure.

FIG. 12 illustrates user recognition processing as may be performed by the user recognition component 695. The ASR component 650 performs ASR processing on ASR feature vector data 1250. ASR confidence data 1207 may be passed to the user recognition component 695.

The user recognition component 695 performs user recognition using various data including the user recognition feature vector data 1240, feature vectors 1205 representing voice profiles of users of the system 600, the ASR confidence data 1207, and other data 1209. The user recognition component 695 may output the user recognition data 1195, which reflects a certain confidence that the user input was spoken by one or more particular users. The user recognition data 1195 may include one or more user identifiers (e.g., corresponding to one or more voice profiles). Each user identifier in the user recognition data 1195 may be associated with a respective confidence value, representing a likelihood that the user input corresponds to the user identifier. A confidence value may be a numeric or binned value.

The feature vector(s) 1205 input to the user recognition component 695 may correspond to one or more voice profiles. The user recognition component 695 may use the feature vector(s) 1205 to compare against the user recognition feature vector 1240, representing the present user input, to determine whether the user recognition feature vector 1240 corresponds to one or more of the feature vectors 1205 of the voice profiles. Each feature vector 1205 may be the same size as the user recognition feature vector 1240.

To perform user recognition, the user recognition component 695 may determine the device 610 from which the audio data 631 originated. For example, the audio data 631 may be associated with metadata including a device identifier representing the device 610. Either the device 610 or the system(s) 620 may generate the metadata. The system 600 may determine a group profile identifier associated with the device identifier, may determine user identifiers associated with the group profile identifier, and may include the group profile identifier and/or the user identifiers in the metadata. The system 600 may associate the metadata with the user recognition feature vector 1240 produced from the audio data 631. The user recognition component 695 may send a signal to voice profile storage 1285, with the signal requesting only audio data and/or feature vectors 1205 (depending on whether audio data and/or corresponding feature vectors are stored) associated with the device identifier, the group profile identifier, and/or the user identifiers represented in the metadata. This limits the universe of possible feature vectors 1205 the user recognition component 695 considers at runtime and thus decreases the amount of time to perform user recognition processing by decreasing the amount of feature vectors 1205 needed to be processed. Alternatively, the user recognition component 695 may access all (or some other subset of) the audio data and/or feature vectors 1205 available to the user recognition component 695. However, accessing all audio data and/or feature vectors 1205 will likely increase the amount of time needed to perform user recognition processing based on the magnitude of audio data and/or feature vectors 1205 to be processed.

If the user recognition component 695 receives audio data from the voice profile storage 1285, the user recognition component 695 may generate one or more feature vectors 1205 corresponding to the received audio data.

The user recognition component 695 may attempt to identify the user that spoke the speech represented in the audio data 631 by comparing the user recognition feature vector 1240 to the feature vector(s) 1205. The user recognition component 695 may include a scoring component 1222 that determines respective scores indicating whether the user input (represented by the user recognition feature vector 1240) was spoken by one or more particular users (represented by the feature vector(s) 1205). The user recognition component 695 may also include a confidence component 1224 that determines an overall accuracy of user recognition processing (such as those of the scoring component 1222) and/or an individual confidence value with respect to each user potentially identified by the scoring component 1222. The output from the scoring component 1222 may include a different confidence value for each received feature vector 1205. For example, the output may include a first confidence value for a first feature vector 1205a (representing a first voice profile), a second confidence value for a second feature vector 1205b (representing a second voice profile), etc. Although illustrated as two separate components, the scoring component 1222 and the confidence component 1224 may be combined into a single component or may be separated into more than two components.

The scoring component 1222 and the confidence component 1224 may implement one or more trained machine learning models (such as neural networks, classifiers, etc.) as known in the art. For example, the scoring component 1222 may use probabilistic linear discriminant analysis (PLDA) techniques. PLDA scoring determines how likely it is that the user recognition feature vector 1240 corresponds to a particular feature vector 1205. The PLDA scoring may generate a confidence value for each feature vector 1205 considered and may output a list of confidence values associated with respective user identifiers. The scoring component 1222 may also use other techniques, such as GMMs, generative Bayesian models, or the like, to determine confidence values.

The confidence component 1224 may input various data including information about the ASR confidence 1207, speech length (e.g., number of frames or other measured length of the user input), audio condition/quality data (such as signal-to-interference data or other metric data), fingerprint data, image data, or other factors to consider how confident the user recognition component 695 is with regard to the confidence values linking users to the user input. The confidence component 1224 may also consider the confidence values and associated identifiers output by the scoring component 1222. For example, the confidence component 1224 may determine that a lower ASR confidence 1207, or poor audio quality, or other factors, may result in a lower confidence of the user recognition component 695. Whereas a higher ASR confidence 1207, or better audio quality, or other factors, may result in a higher confidence of the user recognition component 695. Precise determination of the confidence may depend on configuration and training of the confidence component 1224 and the model(s) implemented thereby. The confidence component 1224 may operate using a number of different machine learning models/techniques such as GMM, neural networks, etc. For example, the confidence component 1224 may be a classifier configured to map a score output by the scoring component 1222 to a confidence value.

The user recognition component 695 may output user recognition data 1195 specific to a one or more user identifiers. For example, the user recognition component 695 may output user recognition data 1195 with respect to each received feature vector 1205. The user recognition data 1195 may include numeric confidence values (e.g., 0.0-1.0, 0-1000, or whatever scale the system is configured to operate). Thus, the user recognition data 1195 may output an n-best list of potential users with numeric confidence values (e.g., user identifier 123—0.2, user identifier 234—0.8). Alternatively or in addition, the user recognition data 1195 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 695 may output an n-best list of user identifiers with binned confidence values (e.g., user identifier 123— low, user identifier 234—high). Combined binned and numeric confidence value outputs are also possible. Rather than a list of identifiers and their respective confidence values, the user recognition data 1195 may only include information related to the top scoring identifier as determined by the user recognition component 695. The user recognition component 695 may also output an overall confidence value that the individual confidence values are correct, where the overall confidence value indicates how confident the user recognition component 695 is in the output results. The confidence component 1224 may determine the overall confidence value.

The confidence component 1224 may determine differences between individual confidence values when determining the user recognition data 1195. For example, if a difference between a first confidence value and a second confidence value is large, and the first confidence value is above a threshold confidence value, then the user recognition component 695 is able to recognize a first user (associated with the feature vector 1205 associated with the first confidence value) as the user that spoke the user input with a higher confidence than if the difference between the confidence values were smaller.

The user recognition component 695 may perform thresholding to avoid incorrect user recognition data 1195 being output. For example, the user recognition component 695 may compare a confidence value output by the confidence component 1224 to a threshold confidence value. If the confidence value does not satisfy (e.g., does not meet or exceed) the threshold confidence value, the user recognition component 695 may not output user recognition data 1195, or may only include in that data 1195 an indicator that a user that spoke the user input could not be recognized. Further, the user recognition component 695 may not output user recognition data 1195 until enough user recognition feature vector data 1240 is accumulated and processed to verify a user above a threshold confidence value. Thus, the user recognition component 695 may wait until a sufficient threshold quantity of audio data of the user input has been processed before outputting user recognition data 1195. The quantity of received audio data may also be considered by the confidence component 1224.

The user recognition component 695 may be defaulted to output binned (e.g., low, medium, high) user recognition confidence values. However, such may be problematic in certain situations. For example, if the user recognition component 695 computes a single binned confidence value for multiple feature vectors 1205, the system may not be able to determine which particular user originated the user input. In this situation, the user recognition component 695 may override its default setting and output numeric confidence values. This enables the system to determine a user, associated with the highest numeric confidence value, originated the user input.

The user recognition component 695 may use other data 1209 to inform user recognition processing. A trained model(s) or other component of the user recognition component 695 may be trained to take other data 1209 as an input feature when performing user recognition processing. Other data 1209 may include a variety of data types depending on system configuration and may be made available from other sensors, devices, or storage. The other data 1209 may include a time of day at which the audio data 631 was generated by the device 610 or received from the device 610, a day of a week in which the audio data 631 was generated by the device 610 or received from the device 610, etc.

The other data 1209 may include image data or video data. For example, facial recognition may be performed on image data or video data received from the device 610 from which the audio data 631 was received (or another device). Facial recognition may be performed by the user recognition component 695. The output of facial recognition processing may be used by the user recognition component 695. That is, facial recognition output data may be used in conjunction with the comparison of the user recognition feature vector 1240 and one or more feature vectors 1205 to perform more accurate user recognition processing.

The other data 1209 may include location data of the device 610. The location data may be specific to a building within which the device 610 is located. For example, if the device 610 is located in user A's bedroom, such location may increase a user recognition confidence value associated with user A and/or decrease a user recognition confidence value associated with user B.

The other data 1209 may include data indicating a type of the device 610. Different types of devices may include, for example, a smart watch, a smart phone, a tablet, and a vehicle. The type of the device 610 may be indicated in a profile associated with the device 610. For example, if the device 610 from which the audio data 631 was received is a smart watch or vehicle belonging to a user A, the fact that the device 610 belongs to user A may increase a user recognition confidence value associated with user A and/or decrease a user recognition confidence value associated with user B.

The other data 1209 may include geographic coordinate data associated with the device 610. For example, a group profile associated with a vehicle may indicate multiple users (e.g., user A and user B). The vehicle may include a global positioning system (GPS) indicating latitude and longitude coordinates of the vehicle when the vehicle generated the audio data 631. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 610 may indicate global coordinates and associated locations (e.g., work, home, etc.). One or more user profiles may also or alternatively indicate the global coordinates.

The other data 1209 may include data representing activity of a particular user that may be useful in performing user recognition processing. For example, a user may have recently entered a code to disable a home security alarm. A device 610, represented in a group profile associated with the home, may have generated the audio data 631. The other data 1209 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 610, this may be reflected in the other data 1209 and considered by the user recognition component 695.

Depending on system configuration, the other data 1209 may be configured to be included in the user recognition feature vector data 1240 so that all the data relating to the user input to be processed by the scoring component 1222 may be included in a single feature vector. Alternatively, the other data 1209 may be reflected in one or more different data structures to be processed by the scoring component 1222.

Figure 13:
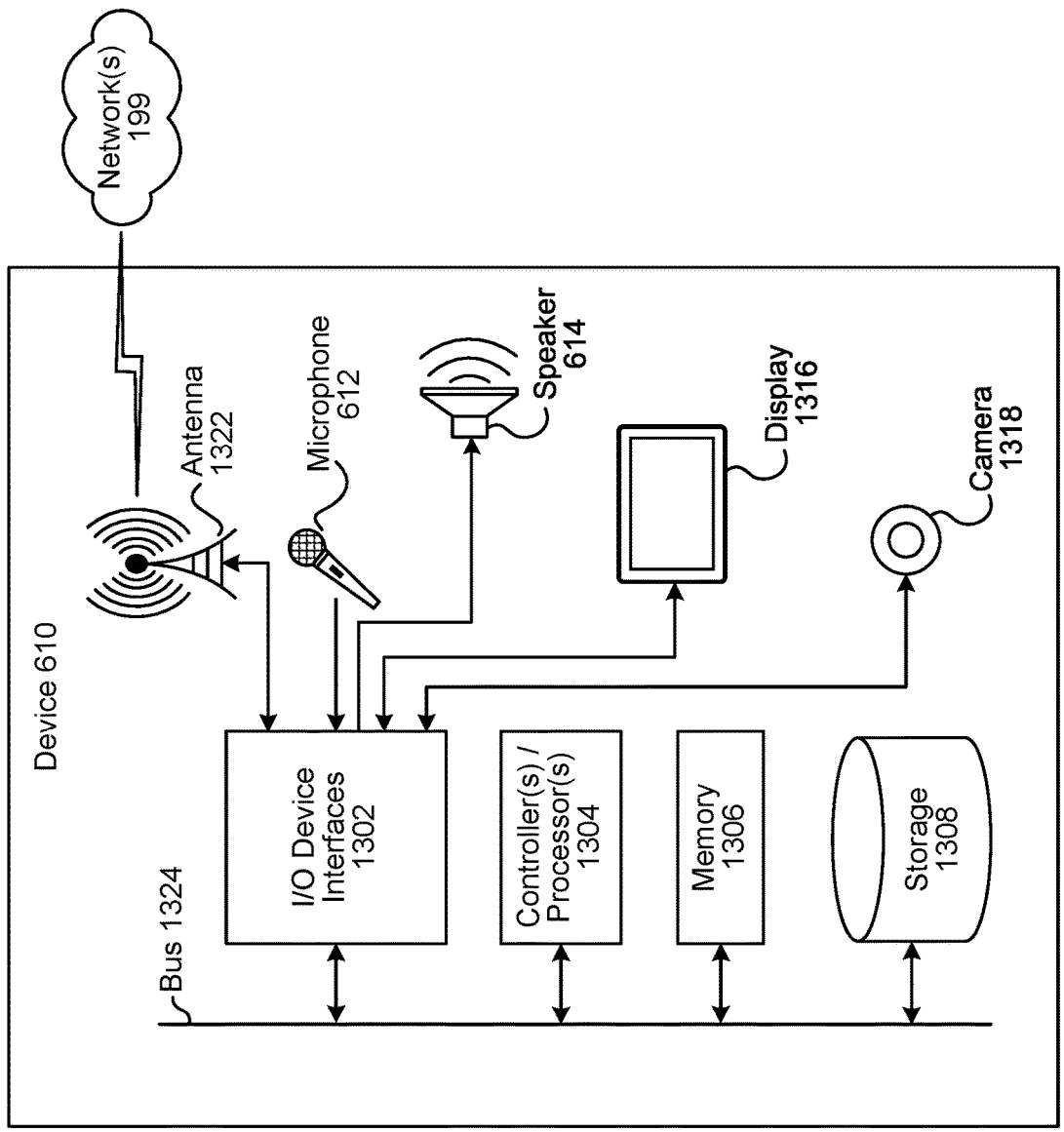
FIG. 13 is a block diagram conceptually illustrating example components of a device, according to embodiments of the present disclosure.
Figure 14:
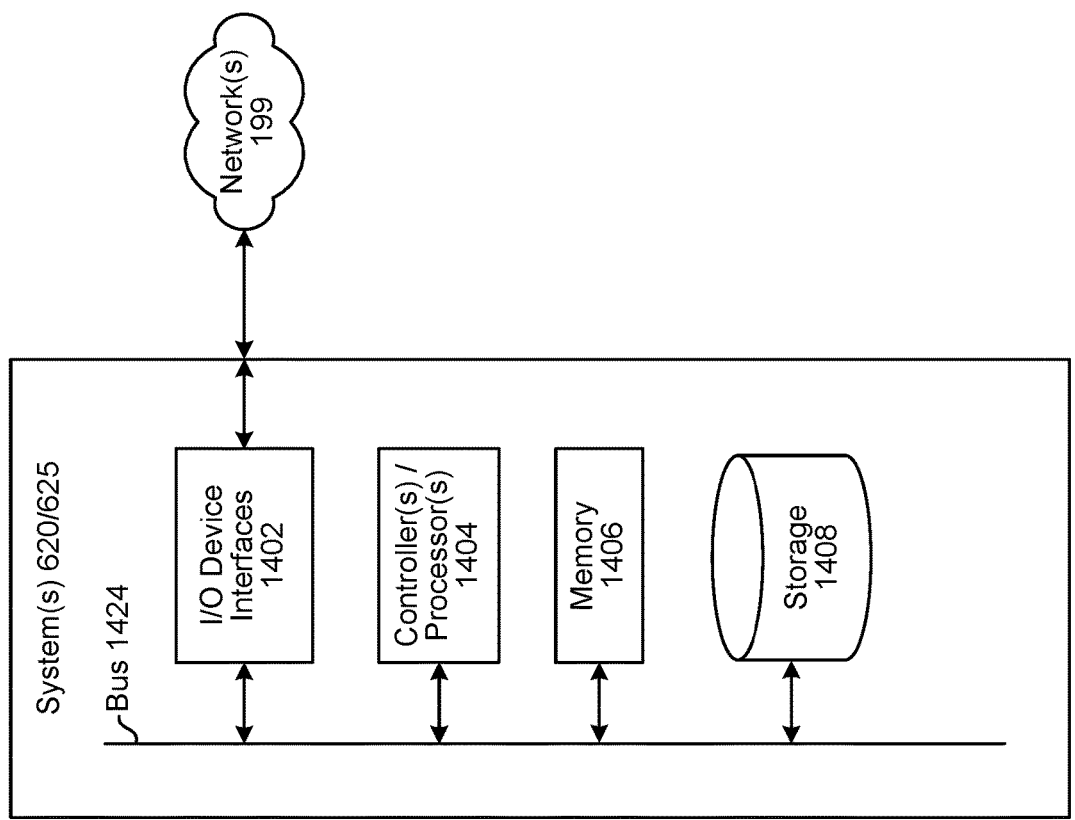
FIG. 14 is a block diagram conceptually illustrating example components of a system, according to embodiments of the present disclosure.

FIG. 13 is a block diagram conceptually illustrating a device 610 that may be used with the system. FIG. 14 is a block diagram conceptually illustrating example components of a remote device, such as the natural language command processing system 620, which may assist with ASR processing, NLU processing, etc., and a skill support system 625. A system (620/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 610 may operate locally to a user (e.g., within a same environment so the device may receive inputs and playback outputs for the user) the server/system 620 may be located remotely from the device 610 as its operations may not require proximity to the user. The server/system 620 may be located in an entirely different location from the device 610 (for example, as part of a cloud computing system or the like) or may be located in a same environment as the device 610 but physically separated therefrom (for example a home server or similar device that resides in a user's home or business but perhaps in a closet, basement, attic, or the like). One benefit to the server/system 620 being in a user's home/business is that data used to process a command/return a response may be kept within the user's home, thus reducing potential privacy concerns.

Multiple systems (620/625) may be included in the overall system 600 of the present disclosure, such as one or more natural language processing systems 620 for performing ASR processing, one or more natural language processing systems 620 for performing NLU processing, one or more skill systems 625, etc. In operation, each of these systems may include computer-readable and computer-executable instructions that reside on the respective device (620/625), as will be discussed further below.

Each of these devices (610/620/625) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (610/620/625) may also include a data storage component (1308/1408) for storing data and controller/processor-executable instructions. Each data storage component (1308/1408) may individually include one or more non-volatile storage types such as magnetic storage, optical storage, solid-state storage, etc. Each device (610/620/625) may also be connected to removable or external non-volatile memory and/or storage (such as a removable memory card, memory key drive, networked storage, etc.) through respective input/output device interfaces (1302/1402).

Computer instructions for operating each device (610/620/625) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (610/620/625) includes input/output device interfaces (1302/1402). A variety of components may be connected through the input/output device interfaces (1302/1402), as will be discussed further below. Additionally, each device (610/620/625) may include an address/data bus (1324/1424) for conveying data among components of the respective device. Each component within a device (610/620/625) may also be directly connected to other components in addition to (or instead of) being connected to other components across the bus (1324/1424).

Referring to FIG. 13, the device 610 may include input/output device interfaces 1302 that connect to a variety of components such as an audio output component such as a loudspeaker 614, a wired headset or a wireless headset (not illustrated), or other component capable of outputting audio. The device 610 may also include an audio capture component. The audio capture component may be, for example, a microphone 612 or array of microphones 612, a wired headset or a wireless headset (not illustrated), etc. If an array of microphones 612 is included, approximate distance to a sound's point of origin may be determined by acoustic localization based on time and amplitude differences between sounds captured by different microphones 612 of the array. The device 610 may additionally include a display 1316 for displaying content. The device 610 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 610, the natural language command processing system 620, or a skill support system 625 may include their own dedicated processors, memory, and/or storage. Alternatively, one or more of the components of the device(s) 610, the natural language command processing system 620, or a skill support system 625 may utilize the I/O interfaces (1302/1402), processor(s) (1304/1404), memory (1306/1406), and/or storage (1308/1408) of the device(s) 610, natural language command processing system 620, or the skill support system 625, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 610, the natural language command processing system 620, and a skill support system 625, as described herein, are illustrative, and may be located as a stand-alone device or may be included, in whole or in part, as a component of a larger device or system. As can be appreciated, a number of components may exist either on a system 620 and/or on device 610; for example, the language processing components 692 (which may include ASR 650), the language output components 693 (which may include NLG 679 and TTS 180), etc., for example as illustrated in FIG. 6. Unless expressly noted otherwise, the system version of such components may operate similarly to the device version of such components and thus the description of one version (e.g., the system version or the local version) applies to the description of the other version (e.g., the local version or system version) and vice-versa.

Figure 15:
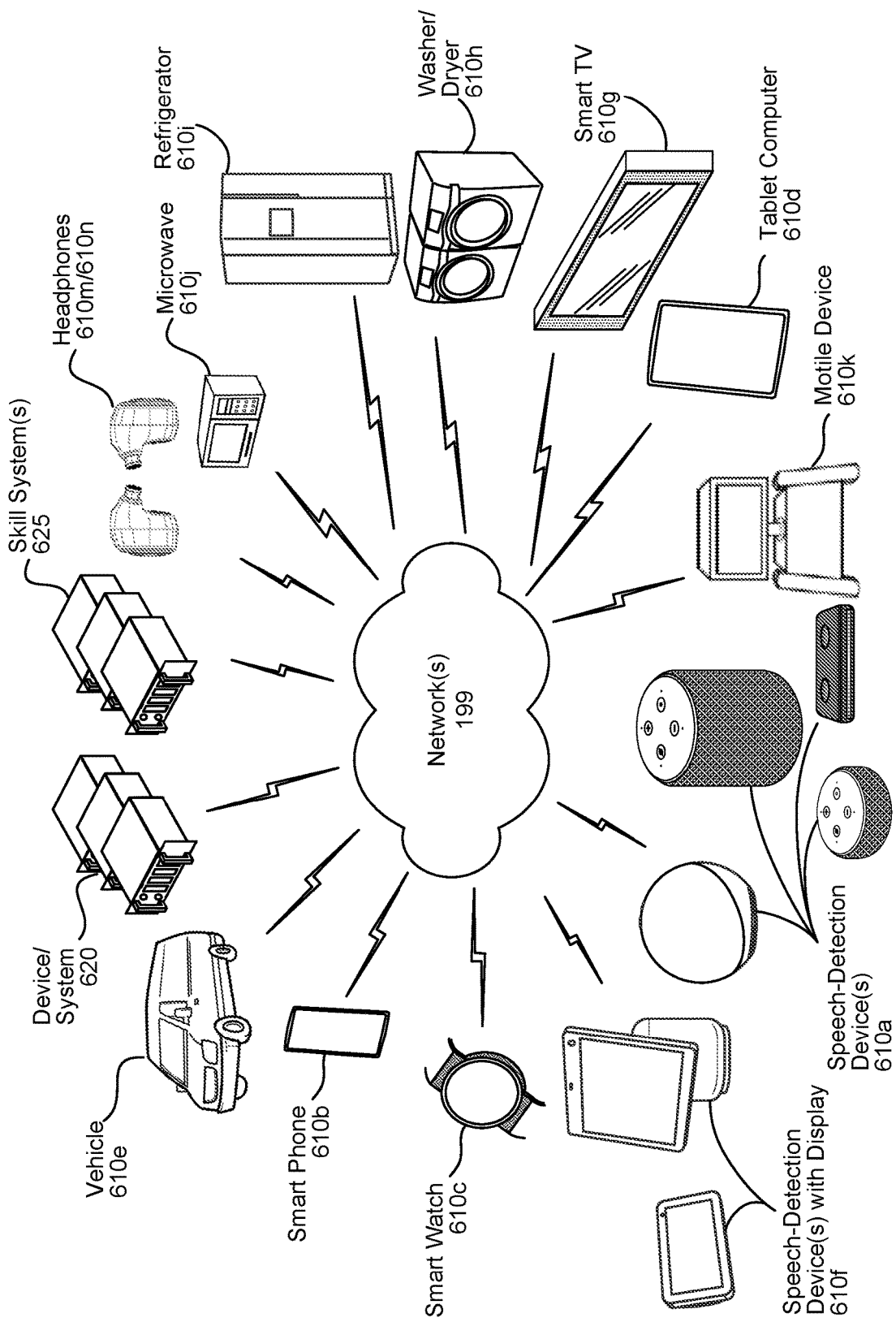
FIG. 15 illustrates an example of a computer network for use with the overall system, according to embodiments of the present disclosure.

As illustrated in FIG. 15, multiple devices (610a-610n, 120, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 610a, a smart phone 610b, a smart watch 610c, a tablet computer 610d, a vehicle 610e, a speech-detection device with display 610f, a display/smart television 610g, a washer/dryer 610h, a refrigerator 610i, a microwave 610j, autonomously motile device 610k (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 620, the skill system(s) 625, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of the natural language command processing system 620.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
    receiving first audio data representing first human speech;
    processing the first audio data using a neural network encoder to generate first encoded data, the first encoded data representing semantic information and feature data of the first human speech, wherein the feature data represents one or more of prosody, timbre, speaker identity, or speaking style of the first human speech;
    training an acoustic/semantic language model (ASLM) to process a first portion of the first encoded data to predict a second portion of the first encoded data, the second portion occurring after the first portion;
    receiving second audio data representing second human speech having voice characteristics to be reproduced by a text-to-speech (TTS) model;
    processing the second audio data using the neural network encoder to generate second encoded data, the second encoded data representing semantic information and feature data of the second human speech, wherein the feature data represents one or more of prosody, timbre, speaker identity, or speaking style of the first human speech;
    processing the second encoded data using the ASLM to generate third encoded data, the third encoded data representing a predicted continuation of the second human speech;
    processing the third encoded data using a neural network decoder to generate third audio data; and
    training the TTS model using the second audio data and the third audio data.

2. The method of claim 1, further comprising:
    determining, using the third encoded data, first data representing a transcript of the predicted continuation of the second human speech;
    processing the first data using the TTS model to generate fourth audio data representing synthesized speech; and
    determining, using the third audio data and the fourth audio data, loss data representing an error between the third audio data and the fourth audio data, wherein training the TTS model is based on the loss data.

3. The method of claim 1, further comprising:
    receiving first data representing phonemes in the first human speech;
    processing the first encoded data using the neural network decoder to generate fourth audio data;
    processing the fourth audio data to determine second data representing phonemes detected in the fourth audio data;
    processing the first data and the second data using a neural network classifier to determine loss data representing an error between the first data and the second data; and
    training one or more of the neural network encoder or the neural network decoder using the loss data.

4. The method of claim 1, further comprising:
    processing the first encoded data using the neural network decoder to generate fourth audio data;
    processing the fourth audio data using a discriminative network to determine a prediction that the fourth audio data is a spectrogram representing speech; and
    training one or more of the neural network encoder or the neural network decoder based on the prediction.

5. A method comprising:
    receiving first audio data representing first speech;
    generating, using the first audio data, first encoded data representing semantic information and feature data of the first speech;
    training a computer model to predict a subsequent portion of the first encoded data based on a preceding portion of the first encoded data;
    receiving second audio data representing second speech;
    generating, using the second audio data, second encoded data representing semantic information and feature data of the second speech;
    processing the second encoded data using the computer model to generate third encoded data, the third encoded data representing a predicted continuation of the second speech; and
    generating, using the third encoded data, third audio data representing first synthesized speech having voice characteristics similar to those of the second speech.

6. The method of claim 5, further comprising:
    determining, using the third encoded data, first data representing a transcript of the predicted continuation of the second speech;
    processing the first data using a TTS model to generate fourth audio data representing second synthesized speech; and
    training the TTS model based on processing the third audio data and the fourth audio data.

7. The method of claim 6, further comprising:
    receiving second data representing a transcript to be output as synthesized speech having the voice characteristics of the second speech; and
    processing the second data using the trained TTS model to generate fifth audio data representing third synthesized speech having the voice characteristics of the second speech.

8. The method of claim 7, wherein the fifth audio data is in a frequency content format, the method further comprising:
    processing the fifth audio data using a vocoder to generate audio waveform data; and
    causing a device to output an audible signal corresponding to the audio waveform data.

9. The method of claim 5, further comprising:
receiving first data representing phonemes in the first speech;
generating, using the first encoded data, fourth audio data;
processing the fourth audio data to determine second data representing phonemes detected in the fourth audio data; and
training one or more of a neural network encoder or a neural network decoder based on processing the first data and the second data, wherein the neural network encoder generates the second encoded data and the neural network decoder generates the third audio data.

10. The method of claim 5, further comprising:
receiving first data representing a speech style label corresponding to the first speech;
generating, using the first encoded data, fourth audio data;
processing the fourth audio data to determine second data representing a predicted speech style label; and
training one or more of a neural network encoder or a neural network decoder based on processing the first data and the second data, wherein the neural network encoder generates the second encoded data and the neural network decoder generates the third audio data.

11. The method of claim 5, further comprising:
generating, using the first encoded data, fourth audio data;
processing the fourth audio data to determine a prediction that the fourth audio data is a spectrogram representing speech; and
training one or more of a neural network encoder or a neural network decoder based on the prediction, wherein the neural network encoder generates the second encoded data and the neural network decoder generates the third audio data.

12. The method of claim 5, further comprising:
performing ASR processing on the first audio data to generate first ASR output data, the first ASR output data including at least a first indication of a first phoneme and a second indication of a second phoneme;
determining a first portion of the first encoded data that represents a first portion of the first audio data corresponding to the first phoneme; and
determining a second portion of the first encoded data that represents a second portion of the first audio data corresponding to the second phoneme.

13. A system, comprising:
at least one processor; and
at least one memory comprising instructions that, when executed by the at least one processor, cause the system to:
receive first audio data representing first speech;
generate, using the first audio data, first encoded data representing semantic information and feature data of the first speech;
train a computer model to predict a subsequent portion of the first encoded data based on a preceding portion of the first encoded data;
receive second audio data representing second speech;
generate, using the second audio data, second encoded data representing semantic information and feature data of the second speech;
process the second encoded data using the computer model to generate third encoded data, the third encoded data representing a predicted continuation of speech; and
generate, using the third encoded data, third audio data representing first synthesized speech having voice characteristics similar to those of the second speech.

14. The system of claim 13, wherein the at least one memory further includes instructions that, when executed by the at least one processor, further cause the system to:
determine, using the third encoded data, first data representing a transcript of the predicted continuation of the second speech;
process the first data using a TTS model to generate fourth audio data representing second synthesized speech; and
train the TTS model based on processing the third audio data and the fourth audio data.

15. The system of claim 14, wherein the at least one memory further includes instructions that, when executed by the at least one processor, further cause the system to:
receive second data representing a transcript to be output as synthesized speech having the voice characteristics of the second speech; and
process the second data using the trained TTS model to generate fifth audio data representing third synthesized speech having the voice characteristics of the second speech.

16. The system of claim 15, wherein the fifth audio data is in a frequency content format, and the at least one memory further includes instructions that, when executed by the at least one processor, further cause the system to:
process the fifth audio data using a vocoder to generate audio waveform data; and
cause a device to output an audible signal corresponding to the audio waveform data.

17. The system of claim 13, wherein the at least one memory further includes instructions that, when executed by the at least one processor, further cause the system to:
receive first data representing phonemes in the first speech;
generate, using the first encoded data, fourth audio data;
process the fourth audio data to determine second data representing phonemes detected in the fourth audio data; and
train one or more of a neural network encoder or a neural network decoder based on processing the first data and the second data, wherein the neural network encoder generates the second encoded data and the neural network decoder generates the third audio data.

18. The system of claim 13, wherein the at least one memory further includes instructions that, when executed by the at least one processor, further cause the system to:
receive first data representing a speech style label corresponding to the first speech;
generate, using the first encoded data, fourth audio data;
process the fourth audio data to determine second data representing a predicted speech style label; and
train one or more of a neural network encoder or a neural network decoder based on processing the first data and the second data, wherein the neural network encoder generates the second encoded data and the neural network decoder generates the third audio data.

19. The system of claim 13, wherein the at least one memory further includes instructions that, when executed by the at least one processor, further cause the system to:
generate, using the first encoded data, fourth audio data;
process the fourth audio data to determine a prediction that the fourth audio data is a spectrogram representing speech; and
train one or more of a neural network encoder or a neural network decoder based on the prediction, wherein the neural network encoder generates the second encoded data and the neural network decoder generates the third audio data.

20. The system of claim 13, wherein the at least one memory further includes instructions that, when executed by the at least one processor, further cause the system to:
- perform ASR processing on the first audio data to generate first ASR output data, the first ASR output data including at least a first indication of a first phoneme and a second indication of a second phoneme;
- determine a first portion of the first encoded data that represents a first portion of the first audio data corresponding to the first phoneme; and
- determine a second portion of the first encoded data that represents a second portion of the first audio data corresponding to the second phoneme.

\* \* \* \* \*